US012650327B2

(12) United States Patent
Shao et al.

(10) Patent No.: US 12,650,327 B2
(45) Date of Patent: Jun. 9, 2026

(54) METHODS AND INTERNET OF THINGS SYSTEMS FOR INSTALLING GAS PIPELINE COMPENSATORS OF SMART GAS

(71) Applicant: CHENGDU QINCHUAN IOT TECHNOLOGY CO., LTD., Chengdu (CN)

(72) Inventors: Zehua Shao, Chengdu (CN); Bin Liu, Chengdu (CN); Lei Zhang, Chengdu (CN); Yong Li, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 544 days.

(21) Appl. No.: 18/186,975

(22) Filed: Mar. 21, 2023

(65) Prior Publication Data

US 2023/0228364 A1     Jul. 20, 2023

(30) Foreign Application Priority Data

Feb. 6, 2023     (CN) .......................... 202310097721.8

(51) Int. Cl.
G01F 15/04          (2006.01)

(52) U.S. Cl.
CPC ................................. G01F 15/043 (2013.01)

(58) Field of Classification Search
CPC .... G01F 15/043; G01F 15/046; G01F 15/066; G06N 3/044; G06N 3/0895; G06N 3/09;

G06Q 50/06; G06Q 10/103; F16L 51/00; F16L 1/026; F16L 1/123; F16L 1/24; F16L 11/127; F16L 2101/30; F16L 55/07;
(Continued)

(56) References Cited

U.S. PATENT DOCUMENTS 6,243,657 B1 * 6/2001 Tuck .................... G01N 29/265
                                                         324/207.13
6,553,322 B1 * 4/2003 Ignagni ................... F16L 55/48
                                                         701/472

(Continued)

OTHER PUBLICATIONS

"Displacement Compensation and Shape Compensator Selection of Combustion Pipeline", Web page <https://wenku.baidu.com/view/19659ac1866a561252d380eb6294dd88d0d23d3b.htm?_wkts_=1683704160430>, Aug. 1, 2019.
(Continued)

*Primary Examiner* — Mohammad K Islam
(74) *Attorney, Agent, or Firm* — METIS IP LLC

(57)          ABSTRACT
The embodiments of the present disclosure provide methods and Internet of Things systems for installing a gas pipeline compensator of smart gas. The method may be implemented by a processor of a smart gas device management platform of an Internet of Things system for installing a gas pipeline compensator of smart gas and may include: obtaining a pipeline feature and an estimated operation feature of a target pipeline; generating an estimated stretching and contracting feature of the target pipeline based on the pipeline feature and the estimated operation feature; and generating an installation parameter of the compensator based on the estimated stretching and contracting feature, wherein the installation parameter at least includes a device parameter of the compensator.

16 Claims, 8 Drawing Sheets

(58) Field of Classification Search
CPC ........... F16L 55/48; F16L 57/02; Y02P 90/02;
G16Y 10/35; F17D 5/00; F17D 5/06;
F17D 1/08; F17D 3/01; F17D 5/005
See application file for complete search history.

(56) References Cited

U.S. PATENT DOCUMENTS

| | | | | |
|---|---|---|---|---|
| 7,178,351 | B2 * | 2/2007 | Varney ................. | G05B 13/024 |
| | | | | 62/611 |
| 8,961,071 | B2 * | 2/2015 | Critsinelis ............... | F16L 1/123 |
| | | | | 405/173 |
| 9,000,778 | B2 * | 4/2015 | Ziolkowski ............... | F17D 3/01 |
| | | | | 324/649 |
| 2011/0161065 | A1 * | 6/2011 | Volker ............... | G01N 29/4418 |
| | | | | 703/14 |
| 2013/0239470 | A1 * | 9/2013 | Buchanan ............. | C10L 1/1824 |
| | | | | 585/13 |
| 2015/0330206 | A1 * | 11/2015 | Trillon ................... | G01N 29/04 |
| | | | | 29/428 |
| 2015/0331007 | A1 * | 11/2015 | Giunta ................... | G01V 1/001 |
| | | | | 702/56 |
| 2017/0030527 | A1 * | 2/2017 | Lisin ......................... | F17D 5/00 |
| 2022/0412787 | A1 * | 12/2022 | Kann ..................... | G01F 15/063 |
| 2025/0109937 | A1 * | 4/2025 | Ruan ........................ | G01C 5/04 |
| 2025/0174995 | A1 * | 5/2025 | Sugita ..................... | H02J 3/003 |

OTHER PUBLICATIONS

"Section 1 Calculation of Linear Expansion and Expansion of Pipes", Web page <https://wenku.baidu.com/view/23f612e21a5f312b3169a45177232f60dccce74e.html?_wkts_=1683706140553>, Nov. 20, 2019.
"Calculation of Pipeline Thermal Compensation", Web page <https://www.docin.com/p-1968890324.html>, Jul. 8, 2017.
"Compensator Installation", Web page <https://wenku.baidu.com/view/95ca4e405bfafab069dc5022aaea998fcd224053.html?_wkts_=1683705452425>, Apr. 8, 2019.

* cited by examiner

200

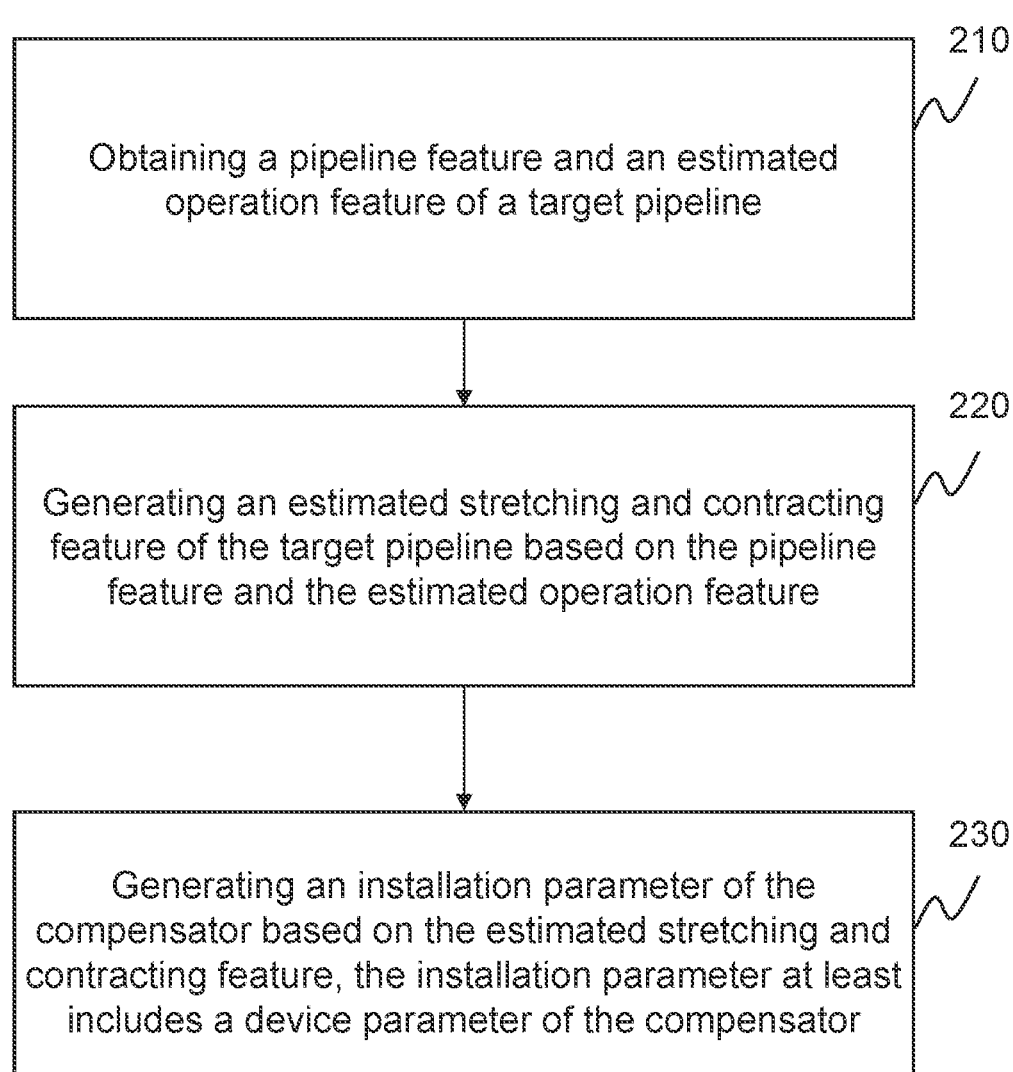

210

Obtaining a pipeline feature and an estimated operation feature of a target pipeline

220

Generating an estimated stretching and contracting feature of the target pipeline based on the pipeline feature and the estimated operation feature

230

Generating an installation parameter of the compensator based on the estimated stretching and contracting feature, the installation parameter at least includes a device parameter of the compensator

Determining a first temperature sequence of the target pipeline

310

Determining the first estimated stretching and contracting amount sequence of the target pipeline based on the pipeline feature, the estimated operation feature, and the first temperature sequence

320

400

410

Obtaining a first gas temperature sequence and a first environmental temperature sequence of the preset scenario

420

Determining the first temperature sequence of the target pipeline based on the first gas temperature sequence, the first environmental temperature sequence, and a medium feature of the target pipeline <u>600</u>

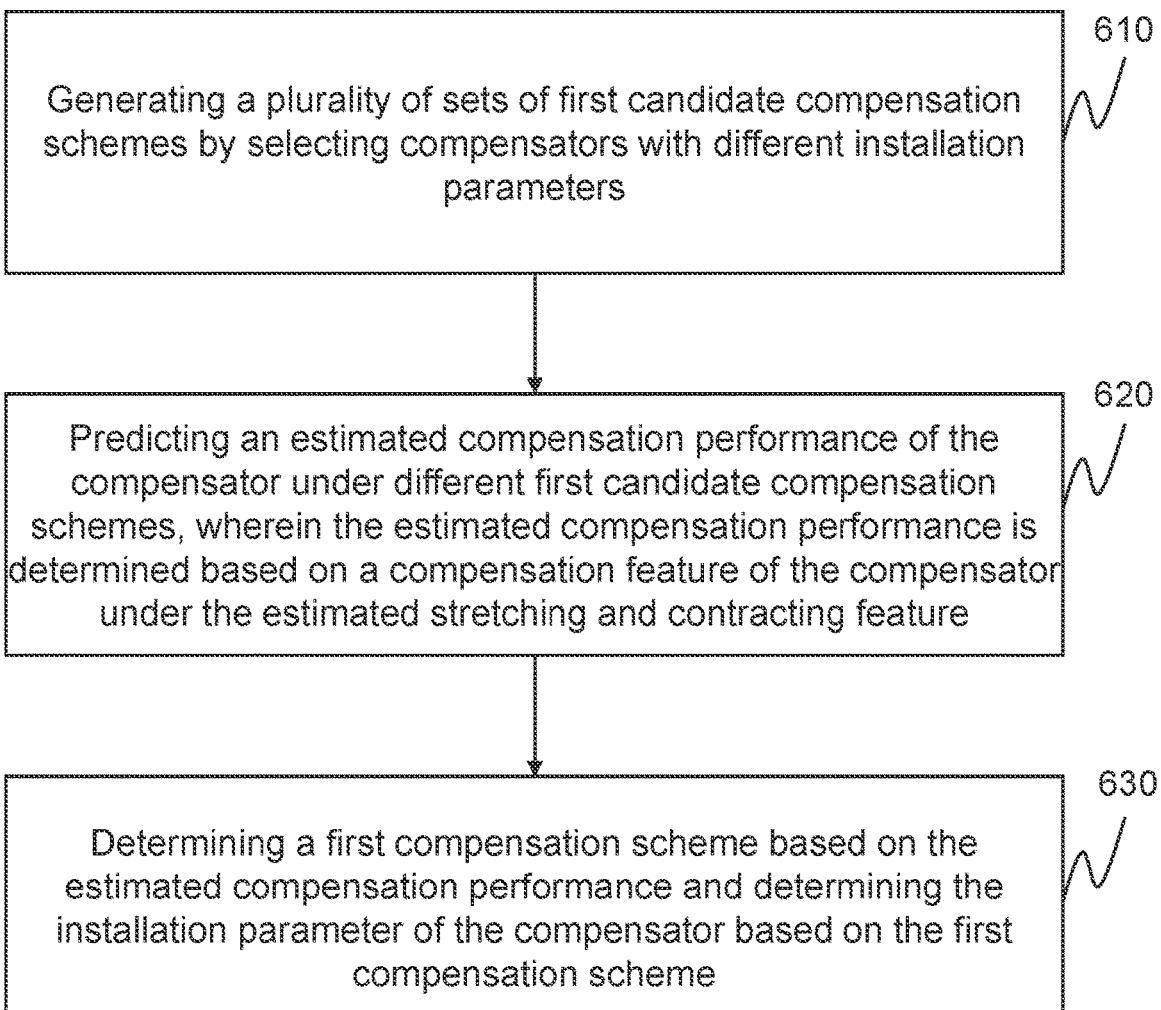

610

Generating a plurality of sets of first candidate compensation schemes by selecting compensators with different installation parameters

620

Predicting an estimated compensation performance of the compensator under different first candidate compensation schemes, wherein the estimated compensation performance is determined based on a compensation feature of the compensator under the estimated stretching and contracting feature

630

Determining a first compensation scheme based on the estimated compensation performance and determining the installation parameter of the compensator based on the first compensation scheme

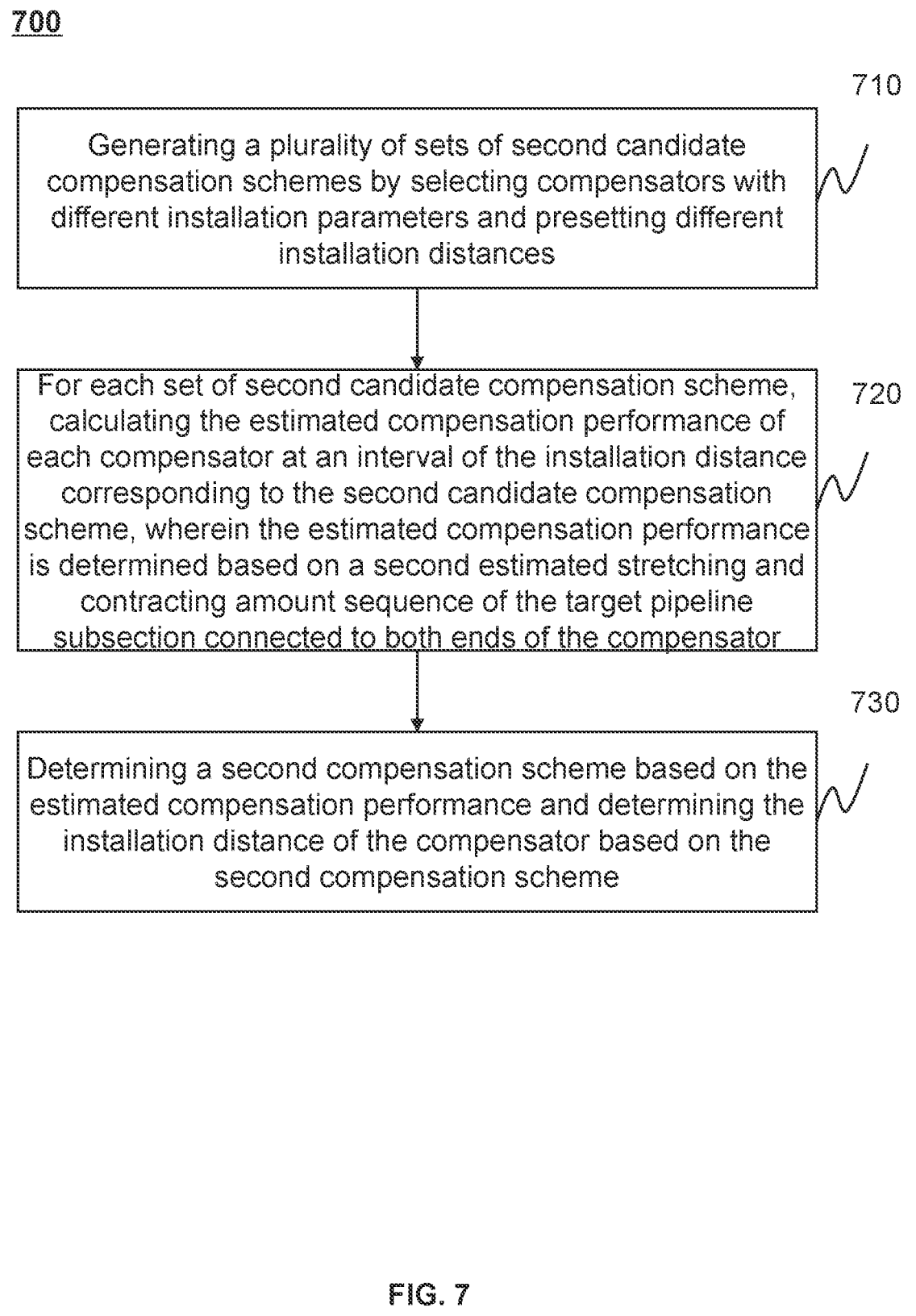

Generating a plurality of sets of second candidate compensation schemes by selecting compensators with different installation parameters and presetting different installation distances

720

For each set of second candidate compensation scheme, calculating the estimated compensation performance of each compensator at an interval of the installation distance corresponding to the second candidate compensation scheme, wherein the estimated compensation performance is determined based on a second estimated stretching and contracting amount sequence of the target pipeline subsection connected to both ends of the compensator

730

Determining a second compensation scheme based on the estimated compensation performance and determining the installation distance of the compensator based on the second compensation scheme

FIG. 7

METHODS AND INTERNET OF THINGS SYSTEMS FOR INSTALLING GAS PIPELINE COMPENSATORS OF SMART GAS

CROSS-REFERENCE TO RELATED APPLICATIONS

This application claims priority of Chinese Patent Application No. 202310097721.8, filed on Feb. 6, 2023, the entire contents of which are hereby incorporated by reference.

TECHNICAL FIELD

The present disclosure relates to the field of gas transmission technology, and in particular, to methods and Internet of Things systems for installing a gas pipeline compensator of smart gas.

BACKGROUND

In the process of gas transmission through a gas pipeline, a change of gas and environmental temperature may cause a metal pipeline to stretch with heat and contract with cold, so that a length of the gas pipeline may change. At the same time, foundation settlement, etc. may also cause stretching and contracting and displacement of the gas pipeline. The stretching and contracting of the gas pipeline may create huge stress, which often leads to pipeline damage and leakage and affects normal production activities. During the planning and installation of the gas pipeline, to relieve the stress, the stretching and contracting of the gas pipeline may be compensated and deformation of the gas pipeline may be absorbed generally using a manner for installing a compensator. However, for the gas pipelines with different features and different environments in which the gas pipelines operate, the possible stretching, contracting, and deformation of the gas pipeline may also be different. It may be difficult to effectively compensate the gas pipeline using the manner for installing a fixed compensator.

Therefore, it is desirable to provide methods and Internet of Things systems for installing a gas pipeline compensator of smart gas to improve the effectiveness of gas pipeline compensation.

SUMMARY

According to one or more embodiments of the present disclosure, a method for installing a gas pipeline compensator of smart gas is provided. The method may be implemented by a processor of a smart gas device management platform of an Internet of Things system for installing a gas pipeline compensator of smart gas and may include: obtaining a pipeline feature and an estimated operation feature of a target pipeline; generating an estimated stretching and contracting feature of the target pipeline based on the pipeline feature and the estimated operation feature; and generating an installation parameter of the compensator based on the estimated stretching and contracting feature, wherein the installation parameter at least includes a device parameter of the compensator.

According to one or more embodiments of the present disclosure, an Internet of Things system for installing a gas pipeline compensator of smart gas is provided. The Internet of Things system may include a smart gas user platform, a smart gas service platform, a smart gas management platform, a smart gas sensor network platform, and a smart gas object platform. The smart gas user platform may include a plurality of smart gas user sub-platforms. The smart gas service platform may include a plurality of smart gas service sub-platforms and the different smart gas service sub-platforms may correspond to the different smart gas user sub-platforms. The smart gas management platform may include a smart gas indoor management sub-platform, a smart gas pipeline network management sub-platform, and a smart gas data center. The smart gas sensor network platform may include a smart gas indoor sensor network sub-platform and a smart gas pipeline network sensor network sub-platform. The smart gas object platform may include a smart gas indoor object sub-platform and a smart gas pipeline network object sub-platform. The smart gas indoor object sub-platform may correspond to the smart gas indoor sensor network sub-platform. The smart gas pipeline network object sub-platform may correspond to the smart gas pipeline network sensor network sub-platform. The smart gas object platform may be configured to obtain a pipeline feature and an estimated operation feature of a target pipeline and upload the pipeline feature and the estimated operation feature to the smart gas data center of the smart gas management platform based on the smart gas sensor network sub-platform corresponding to the smart gas object platform. The smart gas management platform may be configured to generate an estimated stretching and contracting feature of the target pipeline based on the pipeline feature and the estimated operation feature; generate an installation parameter of the compensator based on the estimated stretching and contracting feature, wherein the installation parameter at least includes a device parameter of the compensator; and transmit the installation parameter of the compensator to the smart gas service platform based on the smart gas data center. The smart gas service platform may be configured to upload the installation parameter of the compensator to the smart gas user platform.

According to one or more embodiments of the present disclosure, a non-transitory computer-readable storage medium storing computer instruction is provided. When reading the computer instruction in the storage medium, the computer may execute the method for installing a gas pipeline compensator of smart gas.

BRIEF DESCRIPTION OF THE DRAWINGS

The present disclosure is further illustrated in terms of exemplary embodiments. These exemplary embodiments are described in detail according to the drawings. These embodiments are non-limiting exemplary embodiments, in which like reference numerals represent similar structures, wherein:

FIG. 2 is a flowchart illustrating an exemplary process of a method for installing a gas pipeline compensator of smart gas according to some embodiments of the present disclosure;

FIG. 6 is a flowchart illustrating an exemplary process for determining an installation parameter of a compensator according to some embodiments of the present disclosure;

FIG. 7 is a flowchart illustrating an exemplary process for determining an installation distance of a compensator according to some embodiments of the present disclosure.

DETAILED DESCRIPTION

Figure 1:
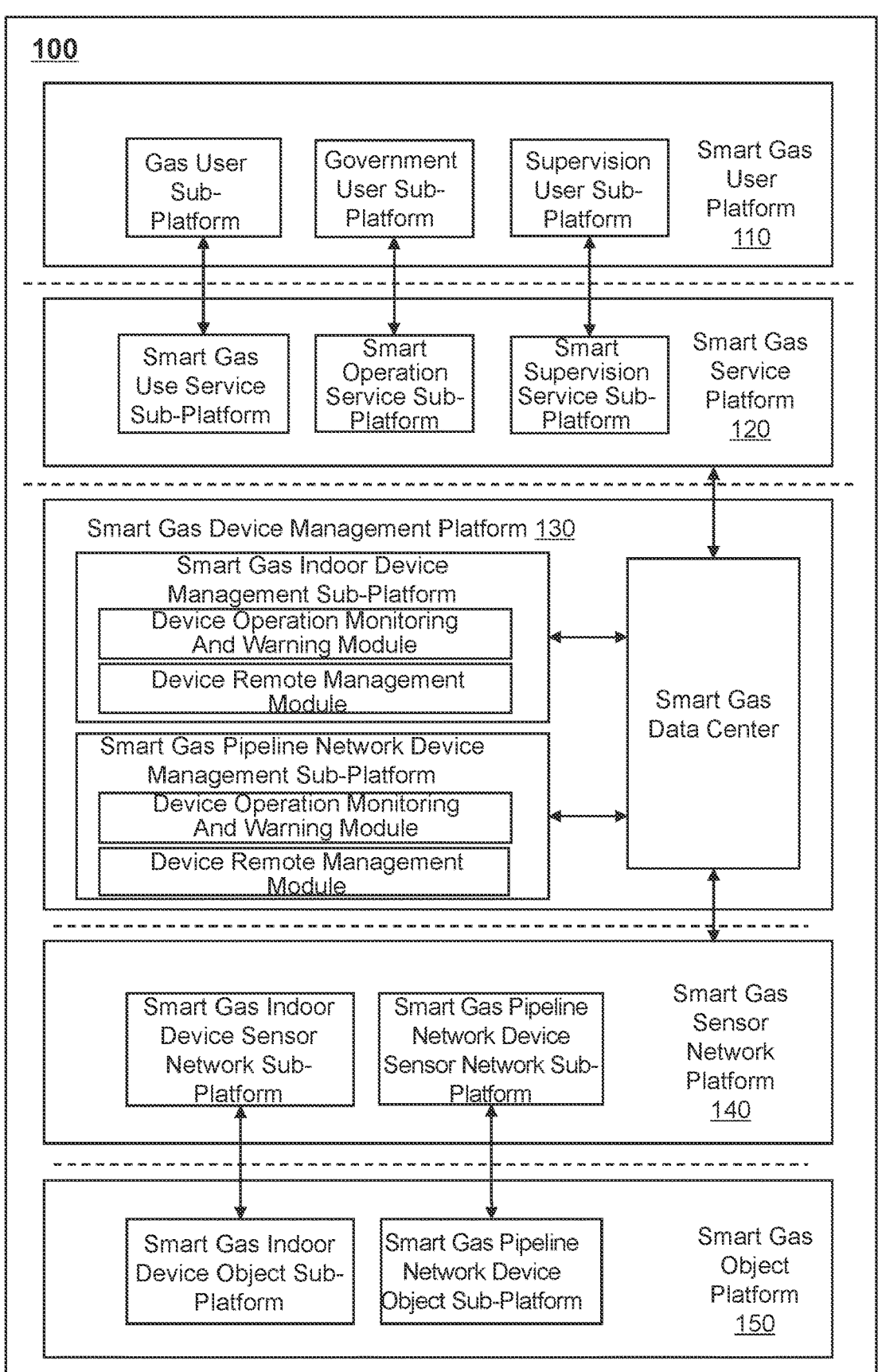
FIG. 1 is a diagram illustrating an exemplary platform structure of an Internet of Things system for installing a gas pipeline compensator of smart gas according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words may be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may further include other steps or elements.

The flowcharts used in the present disclosure illustrate the operation that the system implements according to the embodiment of the present disclosure. It should be understood that the foregoing or following operation may not necessarily be performed exactly in order. Instead, the operation may be processed in reverse order or simultaneously. Besides, one or more other operations may be added to these processes, or one or more operations may be removed from these processes.

A gas pipeline may generate different stretching and contracting amounts due to a change in an external environment in which the gas pipeline operates at different times and changes in temperature and pressure of transmitted gas. For example, a climate change in different seasons in a same region and a climate difference in different regions may lead to changes in the temperature and humidity of the environment in which the gas pipeline operates and the temperature and pressure of the internally transmitted gas may also change. As a result, the gas pipeline may generate different stretching and contracting amounts in different seasons and regions. Naturally, required compensation amount may vary with the different seasons and regions. At the same time, for different compensation needs, it may also be necessary to use different models and materials of compensators to compensate. If no distinction is made, it may be difficult to achieve effective compensation for the gas pipeline using a same compensation scheme and may not be effective in eliminating stress damage caused by stretching, contracting, and deformation of gas pipeline.

In view of this, according to some embodiments of the present disclosure, it is desirable to provide a method for installing a gas pipeline compensator of smart gas. The possible stretching and contracting amount generated by the gas pipeline may be estimated based on data related to an operating environment (e.g., temperature, humidity, soil conditions, etc.) and a feature of a transmitted medium after the gas pipeline is put into operation and an installation parameter of the compensator may be determined based on the stretching and contracting amount, which can improve the accuracy and rationality of the compensator installation and the effectiveness of the gas pipeline compensation.

FIG. 1 is a diagram illustrating an exemplary platform structure of an Internet of Things system for installing a gas pipeline compensator of smart gas according to some embodiments of the present disclosure. In some embodiments, the Internet of Things system 100 for installing a gas pipeline compensator of smart gas may include a smart gas user platform 110, a smart gas service platform 120, a smart gas device management platform 130, a smart gas sensor network platform 140, and a smart gas object platform 150.

The smart gas user platform 110 may be a user-oriented service interface. In some embodiments, the smart gas user platform 110 may include a plurality of smart gas user sub-platforms such as a gas user sub-platform, a government user sub-platform, and a supervision user sub-platform. A gas user may refer to a gas consumer. A government user may refer to a person in a government department who dispatches and operates gas supply. A supervision user may refer to a relevant person who supervises gas supply and usage safety.

In some embodiments, the smart gas user platform 110 may receive information from the user and/or the smart gas service platform 120. For example, the smart gas user platform 110 may receive a query instruction for obtaining data related to a gas operation (e.g., a pipeline feature and an estimated operation feature of a target pipeline) input from the user. As another example, the smart gas user platform 110 may receive information that is fed back to the user from the smart gas service platform 120, for example, the government user sub-platform may receive the method for installing a compensator of the target pipeline, etc. that is fed back to the user from the smart operation service sub-platform.

In some embodiments, the smart gas user platform 110 may be configured to feed back the received information to the user. In some embodiments, the smart gas user platform 110 may be configured to send data and/or an instruction to the smart gas service platform 120, for example, to send an instruction for determining a compensator installation scheme of the target pipeline.

The smart gas service platform 120 may be a platform that performs a preliminary processing on the information. In some embodiments, the smart gas service platform 120 may be configured to interact with the smart gas user platform 110 and the smart gas device management platform 130 for information and/or data. For example, the smart gas service platform 120 may obtain a gas device parameter management information query instruction input by the user from the smart gas user platform 110, upload gas device parameter management information to the smart gas user platform 110, etc. As another example, the smart gas service platform 120 may send the gas device parameter management information query instruction to the smart gas device management platform 130 and obtain the gas device parameter management information from the smart gas device management platform 130, etc.

In some embodiments, the smart gas service platform 120 may include a plurality of smart gas service sub-platforms such as a smart gas use service sub-platform, a smart operation service sub-platform, and a smart supervision service sub-platform. Different smart gas service sub-platforms may correspond to different smart gas user sub-platforms. For example, the smart gas use service sub-platform may correspond to the gas user sub-platform, the smart operation service sub-platform may correspond to the government user sub-platform, and the smart supervision service sub-platform may correspond to the supervision user sub-platform.

In some embodiments, at least one smart gas service sub-platform of the plurality of smart gas service sub-platforms may send a query instruction for querying gas device parameter management information corresponding to the smart gas service sub-platform to the smart gas device management platform 130 to obtain corresponding information. For example, the smart operation service sub-platform may send an instruction for obtaining information related to gas operation (e.g., a gas pipeline compensator installation scheme) to the smart gas device management platform 130, obtain the information related to gas operation (e.g., the gas pipeline compensator installation scheme) from the smart gas device management platform 130, etc.

In some embodiments, at least one smart gas service sub-platform of the plurality of smart gas service sub-platforms may receive the gas device parameter management information query instruction issued by the smart gas user sub-platform the corresponding to the smart gas service sub-platform and upload the corresponding gas device parameter management information to the smart gas user sub-platform. For example, the smart operation service sub-platform may obtain the instruction for obtaining the information related to gas operation (e.g., the gas pipeline compensator installation scheme) input by the user from the government user sub-platform, upload the information related to gas operation (e.g., the gas pipeline compensator installation scheme) to the government user sub-platform, etc.

The smart gas device management platform 130 may refer to an Internet of Things platform that overall plans and coordinates connection and collaboration between the various functional platforms to provide perception management and control management. In some embodiments, the smart gas device management platform 130 may be configured to determine the gas pipeline compensator installation scheme, for example, generating an estimated stretching and contracting feature of the target pipeline based on the pipeline feature and the estimated operation feature; generating an installation parameter of the compensator based on the estimated stretching and contracting feature, the installation parameter at least including a device parameter of the compensator; and transmitting the installation parameter of the compensator to the smart gas service platform 120.

Further description regarding generating the installation parameter of the compensator may be found in FIGS. 2, 6, and 7 and the related description thereof.

In some embodiments, the smart gas device management platform 130 may include a smart gas indoor device management sub-platform, a smart gas pipeline network device management sub-platform, and a smart gas data center. Each smart gas management sub-platform may be set up independently and may interact with the smart gas data center for data. For example, the each smart gas management sub-platform may obtain data (e.g., the pipeline feature and the estimated operation feature) uploaded by the smart gas sensor network platform 140 from the smart gas data center and process the data, and then feedback a processing result (e.g., a compensator installation scheme) to the smart gas data center.

The indoor device may include a gas meter, a metering device, etc. of a gas user. The pipeline network device may include a gas pipeline, a gas gate station compressor, a pressure regulating device, a gas flowmeter, a valve control device, an installed compensator, etc. In some embodiments, the Internet of Things system for installing a pipeline compensator of smart gas may also include a data monitoring device such as a temperature sensor, a pressure sensor, a humidity sensor, etc., configured in a gas pipeline network.

In some embodiments, the smart gas device management platform 130 may interact with the smart gas service platform 120 and the smart gas sensor network platform 140 through the smart gas data center for information and/or data. For example, the smart gas data center may obtain the gas device parameter management information (e.g., the pipeline feature and the estimated operation feature) obtained by the smart gas sensor network platform 140, upload the data processing result (e.g., the compensator installation scheme) fed back by each smart gas device management sub-platform to the smart gas service platform 120, etc. In some embodiments, the smart gas data center may aggregate and store the gas device parameter management information. For example, the smart gas data center may classify, summarize, and store the data uploaded by the smart gas sensor network platform 140. As another example, the smart gas data center may classify, summarize, and store the data processing result fed back by each smart gas device management sub-platform.

In some embodiments, the smart gas indoor device management sub-platform and the smart gas pipeline network device management sub-platform may include a device operation monitoring and warning module and a device remote management module. The device operation monitoring and warning module may be used to view historical and real-time data of indoor and/or pipeline network device operation parameter and monitor and warn according to a preset threshold. The device remote management module may remotely set and adjust the parameter of a smart gas indoor object platform device and/or a smart gas object platform device in the pipeline network of smart gas, and remotely authorize device parameter adjustment initiated on site by the smart gas indoor object platform device and/or the smart gas object platform device in the pipeline network of smart gas.

The smart gas sensor network platform 140 may be a platform that enables interaction and interface between the smart gas device management platform 130 and the smart gas object platform 150. In some embodiments, the smart gas sensor network platform 140 may receive an instruction for obtaining the gas device parameter management information (e.g., an instruction for obtaining the pipeline feature and the estimated operation feature) from the smart gas device management platform 130 through the smart gas data center and send the instruction to the smart gas object platform 150. In some embodiments, the smart gas sensor network platform 140 may be used to receive the gas device parameter management information from the smart gas object platform 150 and upload the received gas device parameter management information to the smart gas data center in the smart gas device management platform 130.

In some embodiments, the smart gas sensor network platform 140 may include a smart gas indoor device sensor network sub-platform and a smart gas pipeline network device sensor network sub-platform. In some embodiments, each smart gas sensor network sub-platform may correspond to each smart gas device management sub-platform and correspond to each smart gas object sub-platform.

In some embodiments, each smart gas sensor network sub-platform may interact with the corresponding smart gas object sub-platform for information and/or data. For example, the smart gas pipeline network device sensor network sub-platform may receive the instruction for obtaining the information related to gas operation sent by the smart gas data center and send the instruction to the corresponding smart gas pipeline network device object sub-platform. As another example, the smart gas pipeline network device sensor network sub-platform may receive the information related to gas operation uploaded by the corresponding smart gas pipeline network device object sub-platform.

The smart gas object platform 150 may be a functional platform for generating perceptual information and finally executing control information. In some embodiments, the smart gas object platform 150 may include a smart gas indoor device object sub-platform and a smart gas pipeline network device object sub-platform. The smart gas indoor device object sub-platform may correspond to the smart gas indoor device sensor network sub-platform. The smart gas pipeline network device object sub-platform may correspond to the smart gas pipeline network device sensor network sub-platform.

In some embodiments, the smart gas object platform 150 may receive the instruction for obtain the gas device parameter management information sent by the smart gas sensor network platform 140 and obtain the corresponding gas device parameter management information through the corresponding smart gas object sub-platform. For example, the smart gas object platform 150 may be used to obtain the pipeline feature and the estimated operation feature based on the instruction and upload the pipeline feature and the estimated operation feature to the smart gas data center of the smart gas device management platform 130 based on the corresponding smart gas sensor network sub-platform. In some embodiments, the smart gas object platform 150 may be configured as various terminal devices (e.g., a pressure regulating device, a gas flowmeter, a valve control device, a temperature sensor, a pressure sensor, a humidity sensor, a soil detector, etc.) to obtain the gas device parameter management information. For example, gas flow data at different locations of the gas pipeline network may be obtained based on the gas flowmeter, environmental temperature data and gas temperature data at different locations of the gas pipeline network may be obtained based on the temperature sensor, gas pressure data at different locations of the gas pipeline network may be obtained based on the pressure sensor, a soil feature outside the gas pipeline network (e.g., soil density, pH, humidity, and porosity) may be obtained based on the soil detector, etc.

It should be understood that the present embodiments in the present disclosure mainly relate to the method for installing a gas pipeline compensator of smart gas. Therefore, the system for implementing the method for installing the compensator is mainly implemented by relying on the government user sub-platform, the smart operation service sub-platform, the smart gas pipeline network device management sub-platform, the smart gas data center, the smart gas pipeline network device sensor network sub-platform, and the smart gas pipeline network device object sub-platform.

It should be noted that the above description of the Internet of Things system for installing a gas pipeline compensator of smart gas and modules thereof are merely provided for the purposes of illustration, and not intended to limit the scope of the present disclosure. Understandably, for those skilled in the art, after understanding the principle of the system, it is possible to randomly combine each module or form a subsystem to connect with other modules without departing from this principle. In some embodiments, the smart gas user platform 110, the smart gas service platform 120, the smart gas device management platform 130, the smart gas sensor network platform 140, and the smart gas object platform 150 disclosed in FIG. 1 may be different modules in one system, or one module implementing the functions of two or more of the above modules. For example, each module may share a storage module and each module may also have its own storage module. Such variations are within the scope of protection of the present disclosure.

FIG. 2 is a flowchart illustrating an exemplary process of a method for installing a gas pipeline compensator of smart gas according to some embodiments of the present disclosure. In some embodiments, the process 200 may be performed by the smart gas device management platform 130. As shown in FIG. 2, the process 200 includes the following operations.

In step 210, obtaining a pipeline feature and an estimated operation feature of a target pipeline.

The target pipeline may refer to a gas pipeline that requires compensator installation. For example, the target pipeline may refer to a newly laid gas pipeline, a gas pipeline that requires compensator replacement or adjustment, etc.

The pipeline feature may refer to information that reflects a feature of a gas pipeline. For example, the pipeline feature may include a length, a diameter, a pipeline material, etc. of the gas pipeline. In some embodiments, the pipeline feature may be obtained from gas pipeline laying planning data. For example, the length and the diameter of each section of pipeline, and the material of a pipeline device used in a planning region may be obtained from the gas pipeline laying planning data.

The estimated operation feature may refer to an estimated feature of a transmitted medium (gas) after the target pipeline is put into service. For example, the estimated operation feature may include a feature such as a temperature, a pressure, etc. of the transmitted gas after the target pipeline is placed into service. In some embodiments, the estimated operation feature may be obtained by analyzing historical gas data. For example, the feature such as the temperature, the pressure, etc. of the gas may be obtained from the gas pipeline network that has been laid in a same region and an average value may be calculated as the estimated operation feature of the target pipeline.

In step 220, generating an estimated stretching and contracting feature of the target pipeline based on the pipeline feature and the estimated operation feature.

The estimated stretching and contracting feature may refer to feature information of stretching and contracting that may be generated by the target pipeline. For example, the estimated stretching and contracting feature may include a possible stretching and contracting amount of the target pipeline, a stretching and contracting speed, etc.

In some embodiments, the stretching and contracting amount of the target pipeline may be determined based on a linear expansion coefficient, a pipeline length, and a temperature difference. For example, the target pipeline stretching and contracting amount=the linear expansion coefficient*the pipeline length*the temperature difference. The linear expansion coefficient denotes a linear expansion coefficient of the pipeline material, which may be obtained from a factory quality parameter of the pipeline, etc., the pipeline length denotes a length of the target pipeline, which may be obtained based on the pipeline installation scheme data, and the temperature difference denotes a difference between a temperature when the target pipeline operate and a temperature when the target pipeline is installed, which may be preset.

In some embodiments, the stretching and contracting speed of the target pipeline may be determined by monitoring the stretching and contracting amount of the target pipeline in an experimental environment for a certain period of time and dividing the stretching and contracting amount by the monitoring time. The experimental environment may simulate a plurality of installation and operation environments that the target pipeline may involve.

In some embodiments, the smart gas device management platform 130 may analyze based on the pipeline feature and the estimated operation feature and generate the estimated stretching and contracting feature of the target pipeline in combination with relevant historical data of an existing gas pipeline. For example, the smart gas device management platform 130 may obtain a stretching and contracting amount feature of another laid pipeline with a pipeline feature and an estimated operation feature same as or similar to those of the target pipeline as the estimated stretching and contracting feature of the target pipeline.

In some embodiments, the estimated stretching and contracting feature may include a first estimated stretching and contracting amount sequence. The smart gas equipment management platform 130 may determine a first temperature sequence of the target pipeline and determine the first estimated stretching and contracting amount sequence of the target pipeline based on the pipeline feature, the estimated operation feature, and the first temperature sequence. The first temperature sequence and the first estimated stretching and contracting amount sequence may correspond to a preset scenario. Further description regarding determining the first estimated stretching and contracting amount sequence may be found in FIG. 3 and the related description thereof.

In some embodiments, the smart gas device management platform 130 may generate the estimated stretching and contracting feature based on the first estimated stretching and contracting amount sequence. For example, the first estimated stretching and contracting amount sequence may be combined to form the estimated stretching and contracting feature.

In step 230, generating an installation parameter of the compensator based on the estimated stretching and contracting feature, wherein the installation parameter at least includes a device parameter of the compensator.

The installation parameter of the compensator may refer to installation information of the compensator in the target pipeline. For example, the installation parameter of the compensator may include a device parameter of the compensator, an installation quantity, an installation interval, an installation location, etc. The compensator may be a device used to compensate for stress generated by the stretching, contracting, and deformation of the gas pipeline. The compensator may include a corrugated compensator, a square compensator, a packing compensator, an expansion compensator, etc.

The device parameter of the compensator may refer to a parameter of the compensator itself. For example, the device parameter of the compensator may include a model, a material, a wall thickness, a count of corrugations, a wave interval of the compensator, etc.

In some embodiments, the smart gas device management platform 130 may generate the installation parameter of the compensator based on the estimated stretching and contracting feature of the target pipeline in combination with stretching and contracting features of other gas pipelines installed with compensators. For example, the smart gas device management platform 130 may determine an installation parameter of a compensator of a gas pipeline installed with a compensator that have a same or similar stretching and contracting feature as the installation parameter of the compensator of the target pipeline based on the estimated stretching and contracting feature of the target pipeline.

In some embodiments, the smart gas device management platform 130 may generate a plurality of sets of first candidate compensation schemes by selecting compensators with different installation parameters, predict an estimated compensation performance of the compensator under different first candidate compensation schemes, wherein the estimated compensation performance is determined based on a compensation feature of the compensator under the estimated stretching and contracting feature, and determine a first compensation scheme based on the estimated compensation performance and determine the installation parameter of the compensator based on the first compensation scheme. Further description regarding determining the installation parameter of the compensator based on the first candidate compensation scheme may be found in FIG. 6 and the related description thereof.

In some embodiments, the installation parameter may also include an installation distance. The smart gas device management platform 130 may generate a plurality of sets of second candidate compensation schemes by selecting compensators with different installation parameters and presetting different installation distances, for each set of second candidate compensation schemes, calculate the estimated compensation performance of each compensator at an interval of the installation distance corresponding to the second candidate compensation scheme, wherein the estimated compensation performance is determined based on a second estimated stretching and contracting amount sequence of the target pipeline subsection connected to both ends of the compensator, and determine a second compensation scheme based on the estimated compensation performance and determine the installation distance of the compensator based on the second compensation scheme. Further description regarding determining the installation distance of the compensator may be found in FIG. 7 and the related description thereof.

In some embodiments of the present disclosure, the possible stretching and contracting feature of the target pipeline may be estimated in advance by obtaining the pipeline feature, the estimated operation feature, etc. of the target pipeline and then a suitable compensator installation scheme may be determined based on the stretching and contracting feature, which can avoid inadequate compensation or excessive compensation of the gas pipeline (resulting in waste of resources) caused by blind installation of compensators, and at the same time consider the influence of the feature of the target pipeline and future operating environmental feature on the stretching and contracting amount of the gas pipeline, thereby determining the installation parameter of the compensator more accurately and reasonably, improving the effectiveness of installation of the gas pipeline compensator, and increasing the service life of the gas pipeline.

Figure 3:
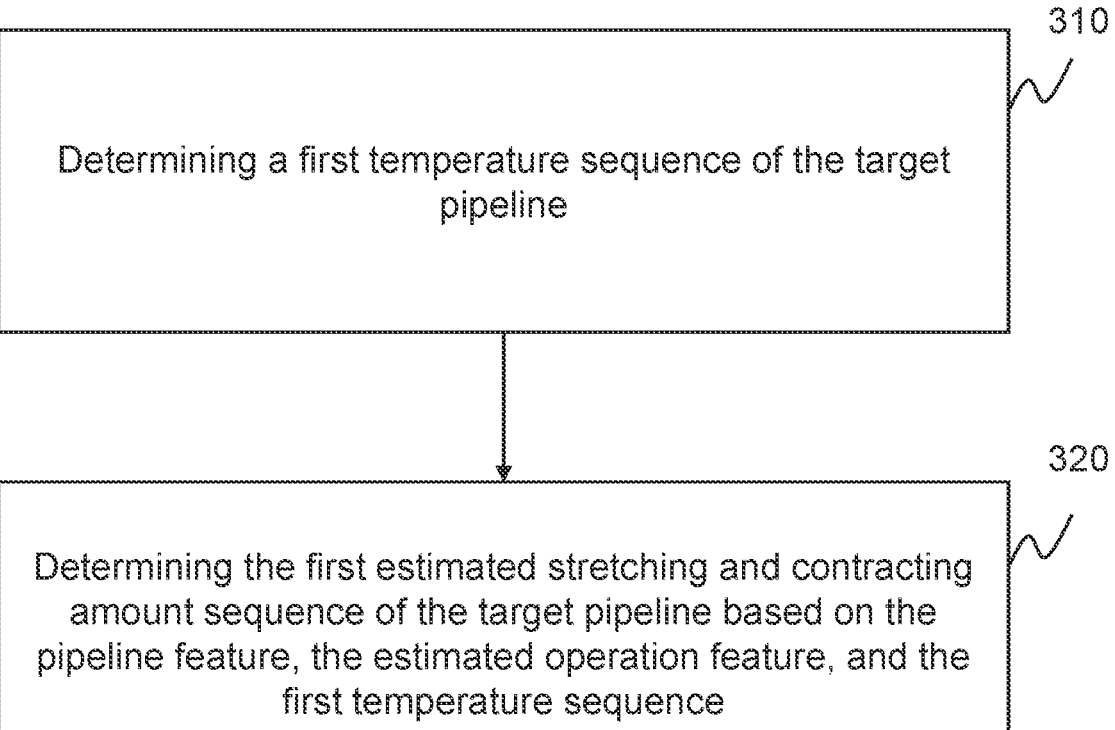
FIG. 3 is a flowchart illustrating an exemplary process for determining a first estimated stretching and contracting amount sequence according to some embodiments of the present disclosure.

FIG. 3 is a flowchart illustrating an exemplary process for determining a first estimated stretching and contracting amount sequence according to some embodiments of the present disclosure. In some embodiments, the process 300 may be performed by the smart gas device management platform 130.

In some embodiments, the estimated stretching and contracting feature may include the first estimated stretching and contracting amount sequence. In some embodiments, the smart gas device management platform 130 may determine an estimated stretching and contracting feature of a target pipeline based on a pipeline feature and an estimated operation feature, which may include the following operations shown in FIG. 3.

In step 310, determining a first temperature sequence of the target pipeline.

In some embodiments, the first temperature sequence may correspond to a preset scenario. The preset scenario may refer to an assumed transportation scenario, an assumed operation scenario, and an assumed emergency scenario of the gas pipeline. For example, the transportation scenario may include a possible transportation environment of the gas pipeline and a temperature, a pressure, and a humidity of the transportation environment. The operation scenario may include a possible operation environment of the gas pipeline (e.g., temperature, soil feature), a temperature and a pressure of the transmitted medium, etc. The emergency scenario may include a scenario such as an earthquake, an urban construction, a heavy object compression, a fire, etc., that may cause stress in the gas pipeline.

In some embodiments, the preset scenario may include a plurality of scenarios. Selection of the plurality of preset scenarios may be related to a future environmental feature when the target pipeline is put into operation.

The future environmental feature may refer to a natural environmental feature of a region where the gas pipeline will operate in a future time. For example, the environmental feature may include a feature such climate, temperature, humidity, soil, etc. of the region where the gas pipeline operates. The future time may refer to a time after the gas pipeline is put into operation. For example, if the gas pipeline is put into operation on Jan. 1, 2025, the future time may be a time after Jan. 1, 2025.

In some embodiments, the smart gas equipment management platform 130 may select the preset scenario based on the future environmental feature of the target pipeline when the target pipeline is put into operation. For example, during the selection of the preset scenario, a preset scene that is same as or similar to the future environmental feature when the target pipeline is put into operation may be selected.

In some embodiments, during the selection of the preset scenario, some extreme scenarios that may occur when the target pipeline is put into operation may be selected. For example, the extreme scenario may include a high temperature scenario, a heavy drought scenario, a heavy rain scenario, a flood scenario, etc.

The stretching and contracting amounts of the target pipeline under the plurality of future preset scenarios may be determined by selecting the preset scenario that is same as or similar to the future environmental feature when the target pipeline is put into operation, which is more in line with the stretching and contracting amount that the target pipeline may generate in an actual operating environment in the future and can provide reliable data support for the subsequent determination of the installation parameter of the compensator. At the same time, some preset scenarios under extreme conditions may be selected, which can prevent the extreme conditions that may occur during the operation of the target pipeline in advance, prepare a response scheme in advance, and improve a risk resistance capacity of the target pipeline.

The first temperature sequence may refer to a sequence composed of temperatures of the target pipeline at a plurality of time points in the preset scenario. The plurality of time points may be future time points after the target pipeline of each preset scenario is put into operation. For example, if the gas pipeline is put into operation on Jan. 1, 2025 and the preset scenario is the high temperature scenario, the plurality of time points may be preset times in the high temperature scenario after Jan. 1, 2025 and the first temperature sequence may be a sequence composed of temperatures at the plurality of time points.

In some embodiments, the smart gas device management platform 130 may determine temperature data at the plurality of future time points in each preset scenario after the target pipeline is put into operation and form the first temperature sequence of the target pipeline corresponding to the preset scenario based on temperature data in the corresponding preset scenario.

In some embodiments, the smart gas device management platform 130 may obtain a first gas temperature sequence and a first environmental temperature sequence of the preset scenario, and determine the first temperature sequence of the target pipeline based on the first gas temperature sequence, the first environmental temperature sequence, and a medium feature of the target pipeline. Further description regarding determining the first temperature sequence may be found in FIG. 4 and the related description thereof.

In step 320, determining the first estimated stretching and contracting amount sequence of the target pipeline based on the pipeline feature, the estimated operation feature, and the first temperature sequence.

The first estimated stretching and contracting amount sequence may refer to a sequence composed of estimated stretching and contracting amounts of the target pipeline at a plurality of time points. The plurality of time points may be the same as time points corresponding to a plurality of temperatures in the first temperature sequence. In some embodiments, the first estimated stretching and contracting amount sequence may correspond to a preset scenario.

In some embodiments, the smart gas device management platform 130 may predict the estimated stretching and contracting amounts at the plurality of time points after the target pipeline is put into operation to form the first estimated stretching and contracting amount sequence based on the plurality of estimated stretching and contracting amounts. In some embodiments, the smart gas device management platform 130 may determine a historical stretching and contracting amount sequence as the first estimated stretching and contracting amount sequence of the target pipeline in the corresponding preset scenario based on the historical stretching and contracting amount of an operated gas pipeline with a pipeline feature same as that of the pipeline feature of the target pipeline and an operation environmental feature same as a feature of each preset scenario of the target pipeline.

In some embodiments, the target pipeline may be divided into a plurality of target pipeline subsections based on a preset rule. The first estimated stretching and contracting amount sequence of the target pipeline may include second estimated stretching and contracting amount sequences of the plurality of target pipeline subsections.

The preset rule may refer to a preset rule that determines the plurality of target pipeline subsections by dividing the target pipeline. For example, the preset rule may refer to a rule of dividing based on a preset interval (e.g., 10 meters), dividing based on distribution of the target pipeline, dividing based on a difference in an external environment of the target pipeline, etc. The distribution of the target pipeline may refer to whether the target pipeline includes a trunk and a branch. At this time, the trunk and different branches may be divided into the plurality of target pipeline subsections. The difference in the external environment of the target pipeline may refer to a difference in temperature, humidity, and soil feature of the environment. At this time, the target pipeline in different external environments may be divided into different subsections based on the difference in external environment.

The target pipeline subsection may refer to each section of a target pipeline that is divided into a plurality of sections. For example, the target pipeline may be divided into three segments A, B, and C. A, B, and C may be the target pipeline subsections.

In some embodiments, the smart gas device management platform 130 may obtain the plurality of target pipeline subsections by dividing the target pipeline based on the preset rule. For example, the smart gas device management platform 130 may divide the target pipeline based on the preset interval. As another example, the smart gas device management platform 130 may divide the trunk and the plurality of branches of the target pipeline into different subsections based on the distribution of the target pipeline. As yet another example, the smart gas device management platform 130 may divide the target pipeline in different external environments into different subsections based on the difference in the external environment in which the target pipeline is located.

The second estimated stretching and contracting amount sequence may refer to a sequence composed of estimated stretching and contracting amounts of the target pipeline subsection at a plurality of time points after the target pipeline is put into operation. The plurality of time points may be the same as the time points corresponding to the plurality of estimated stretching and contracting amounts in the first estimated stretching and contracting amount sequence.

In some embodiments, the second estimated stretching and contracting amount sequence of the target pipeline subsection may be determined based on a linear expansion coefficient of the target pipeline subsection, a pipeline length and a temperature difference of the target pipeline subsection. For example, a second estimated stretching and contracting amount sequence of the target pipeline subsection may be composed of the stretching and contracting amounts of the target pipeline subsection at the plurality of time points under the preset scenario. The stretching and contracting amount of the target pipeline subsection=the linear expansion coefficient of the target pipeline subsection*the pipeline length of the target pipeline subsection*the temperature difference of the target pipeline subsection under each preset scenario. Further description regarding the linear expansion coefficient, the pipeline length, and the temperature difference may be found in FIG. 2 and related description thereof.

In some embodiments, the smart gas device management platform 130 determining the first estimated stretching and contracting amount sequence of the target pipeline based on the pipeline feature, the estimated operation feature, and the first temperature sequence may include: determining the second estimated stretching and contracting amount sequence of the target pipeline subsection based on the pipeline feature, the estimated operation feature, and a second temperature sequence of the target pipeline subsection. The second temperature sequence and the second estimated stretching and contracting amount sequence may correspond to the preset scenario.

In some embodiments, the second estimated stretching and contracting amount sequence may be determined based on a stretching and contracting amount sequence model. The smart gas device management platform 130 may input the pipeline feature, the estimated operation feature, and a second temperature sequence of the target pipeline subsection into the stretching and contracting amount sequence model and output the second estimated stretching and contracting amount sequence. The stretching and contracting amount sequence model may be a machine learning model. Further description regarding determining the second estimated stretching and contracting amount sequence based on the stretching and contracting amount sequence model may be found in FIG. 8 and the descriptions thereof.

The second temperature sequence of the target pipeline subsection may refer to a sequence composed of temperatures of the target pipeline subsection at a plurality of time points in each preset scenario after the target pipeline is put into operation. The plurality of time points may be the same as time points corresponding to the plurality of temperatures in the first temperature sequence.

In some embodiments, the smart gas device management platform 130 may obtain temperature data of the target pipeline subsection at the plurality of time points in the plurality of preset scenarios after the target pipeline subsection is put into operation by simulating operation of the target pipeline subsection under the plurality of preset scenarios and determine the second temperature sequence corresponding to the target pipeline subsection under each preset scenario based on temperature data.

In some embodiments, the second temperature sequence of the target pipeline subsection may be determined based on a temperature sequence model, which may include: inputting a second gas temperature sequence, a second environmental sequence, and a medium feature of the target pipeline subsection into the temperature sequence model and outputting the second temperature sequence of the target pipeline subsection.

The second gas temperature sequence may refer to a sequence composed of temperatures of the gas transmitted in the target pipeline subsection at a plurality of time points. In some embodiments, the smart gas management platform may obtain the gas temperatures of the target pipeline subsection at the plurality of time points in the plurality of preset scenarios after the target pipeline is put into operation by simulating the operation of the target pipeline subsection under the plurality of preset scenarios and generate the second gas temperature sequence based on the gas temperatures of the target pipeline subsection at the plurality of time points. The plurality of time points may be same as the time points corresponding to the plurality of temperatures in the first temperature sequence.

In some embodiments, the gas temperature of the target pipeline subsection may be related to a gas transportation direction and a gas transportation distance of the target pipeline subsection. The smart gas device management platform 130 may determine the gas temperature of the target pipeline subsection based on the gas transportation direction and the gas transportation distance of the target pipeline subsection to form the second gas temperature sequence by determining the gas temperatures at the plurality of time points. Further description regarding the gas transportation direction and the gas transportation distance may be found in FIG. 5 and the related description thereof.

The second environmental temperature sequence may refer to a sequence composed of environmental temperatures at the plurality of time points corresponding to each preset scenario after the target pipeline subsection is put into operation. In some embodiments, the smart gas device management platform 130 may obtain the environmental temperatures corresponding to the target pipeline subsection at the plurality of time points in each preset scenario after the target pipeline is put into operation by simulating the operation of the target pipeline subsection under the plurality of preset scenarios and generate the second environmental temperature sequence corresponding to each preset scenario based on the environmental temperatures corresponding to the target pipeline subsections at the plurality of time points.

The medium feature of the target pipeline subsection may refer to features of an internal medium and an external medium of the target pipeline subsection in each of the plurality of preset scenarios. In some embodiments, the medium feature of the target pipeline may include an external medium feature and an internal medium feature. For example, if the internal medium of the target pipeline subsection is gas, the internal medium feature may include composition, pressure, flow rate, etc. of the gas. As another example, if the external medium of the target pipeline subsection includes air and soil, the external medium feature may include humidity and density of the air and humidity, density, porosity, etc. of the soil.

In some embodiments, the smart gas device management platform 130 may obtain the internal medium feature of the target pipeline subsection in each simulated preset scenario through a metering device configured in the gas pipeline by simulating each preset scenario. In some embodiments, the smart gas device management platform 130 may obtain the external medium feature of the target pipeline subsection in each simulated preset scenario based on a soil detector, a humidity sensor, etc.

The temperature sequence model may be a machine learning model. A structure of the temperature sequence model may be seen in FIG. 5 and the related description thereof.

In some embodiments, an input of the temperature sequence model may be the second gas temperature sequence, the second environmental temperature sequence, and the medium feature of the target pipeline subsection. An output of the temperature sequence model may be the second temperature sequence of the target pipeline subsection.

In some embodiments, the temperature sequence model may be obtained by training. Further description regarding training the temperature sequence model may be found in FIG. 5 and related description thereof.

In some embodiments of the present disclosure, the second temperature sequence of the target pipeline subsection may be determined by processing the second gas temperature sequence of the target planning subsection, the second environmental temperature sequence of the target planning subsection, and the medium feature of the target pipeline subsection using the temperature sequence model, which can extract deep-level features of the gas temperature, the environmental temperature, and the medium feature and the pipeline temperature of the pipeline using the self-learning capability of the machine learning model. Meanwhile, the accuracy of determining the first temperature sequence can be improved by predicting the second temperature sequence of the target pipeline subsection and determining the first temperature sequence based on the second temperature sequence.

The accuracy of the stretching and contracting sequence can be improved by dividing the target pipeline, determining the second estimated stretching and contracting amount sequence of the target pipeline subsection corresponding to each estimated scenario, and determining the stretching and contracting amount sequence based on the plurality of the second estimated stretching and contracting amount sequences.

In some embodiments of the present disclosure, the first estimated stretching and contracting amount sequence of the target pipeline corresponding to each estimated preset scenario may be determined by selecting possible preset scenarios of the plurality of target pipeline, which can provide data support for the subsequent determination of the installation parameter of the compensator based on the estimated stretching and contracting amount. At the same time, the future operating environment where the plurality of target pipelines are located may be considered by presetting the plurality of future scenarios, so that various possible target stretching and contracting amounts and the corresponding methods for installing the compensators can be determined in advance, thereby improving the efficiency and effectiveness of pipeline compensator installation.

It should be noted that the above description of the process 300 is merely provided for the purposes of illustration, and is not intended to limit the scope of the present disclosure. For those skilled in the art, various amendments and variations can be made to the process 300 under the guidance of the present disclosure. However, these amendments and variations remain within the scope of the present disclosure.

Figure 4:
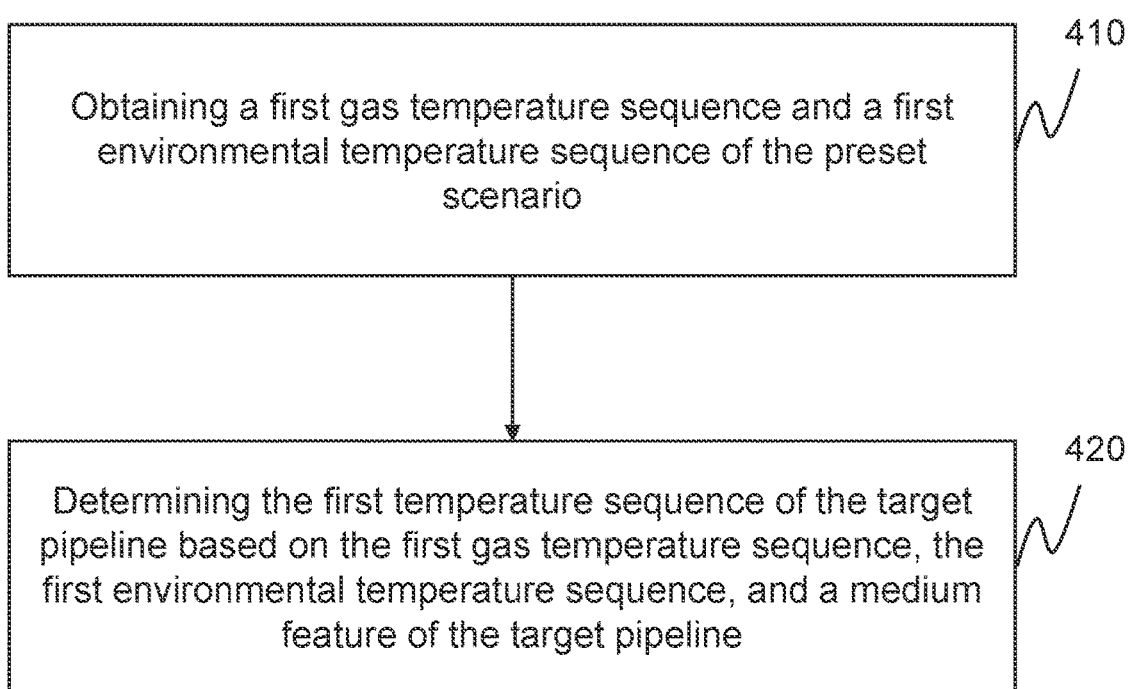
FIG. 4 is a flowchart illustrating an exemplary process for determining a first temperature sequence according to some embodiments of the present disclosure.

FIG. 4 is a flowchart illustrating an exemplary process for determining a first temperature sequence according to some embodiments of the present disclosure. In some embodiments, the process 400 may be performed by the smart gas device management platform 130. As shown in FIG. 4, the process 400 may include the following operations.

In step 410, obtaining a first gas temperature sequence and a first environmental temperature sequence of a preset scenario.

The first gas temperature sequence may refer to a sequence composed of temperatures of gas transmitted in a target pipeline at a plurality of time points under each preset scenario. In some embodiments, the smart gas device management platform 130 may obtain the gas temperatures of the target pipeline at the plurality of time points under each preset scenario after the target pipeline is put into operation and generate the first gas temperature sequence based on the gas temperatures of the target pipeline at the plurality of time points. The plurality of time points may be the same as time points corresponding to the plurality of temperatures in the first temperature sequence. In some embodiments, the smart gas management platform may simulate operation of the target pipeline under the plurality of preset scenarios through a simulation experiment and then monitor the gas temperatures at the plurality of time points as the gas temperatures of the target pipeline at the plurality of time points under each preset scenarios.

The first environmental temperature sequence may refer to a sequence composed of temperatures of an external environment in which the target pipeline is located. In some embodiments, the smart gas device management platform 130 may obtain environmental temperature data at the plurality of time points under each preset scenarios after the target pipeline is put into operation, and determine the first environmental temperature sequence based on the environmental temperature data at the plurality of time points. In some embodiments, the smart gas management platform may simulate the operation of the target pipeline under the plurality of preset scenarios through a simulation experiment and then monitor the environmental temperatures at the plurality of time points as the environmental temperatures of the target pipeline at the plurality of time points under each preset scenarios.

In step 420, determining the first temperature sequence of the target pipeline based on the first gas temperature sequence, the first environmental temperature sequence, and a medium feature of the target pipeline.

In some embodiments, the smart gas device management platform 130 may obtain temperatures at a plurality of historical time points of other operated pipelines that have a first gas temperature sequence, an environmental temperature sequence, and a medium feature same as those of the target pipeline and a pipeline operation scenario same as each preset scenario and determine the temperature sequence of the target pipeline under each preset scenario.

In some embodiments, the determining the first temperature sequence of the target pipeline based on the first gas temperature sequence, the first environmental temperature sequence, and the medium feature of the target pipeline may include: inputting the first gas temperature sequence, the first environmental temperature sequence, and the medium feature of the target pipeline into a temperature sequence model and outputting the first temperature sequence of the target pipeline. The temperature sequence model may be a machine learning model.

In some embodiments, the temperature sequence model may be a Deep Neural Networks (DNN) model, a Recurrent Neural Networks (RNN) model, other custom networks model, or any combination thereof.

Figure 5:
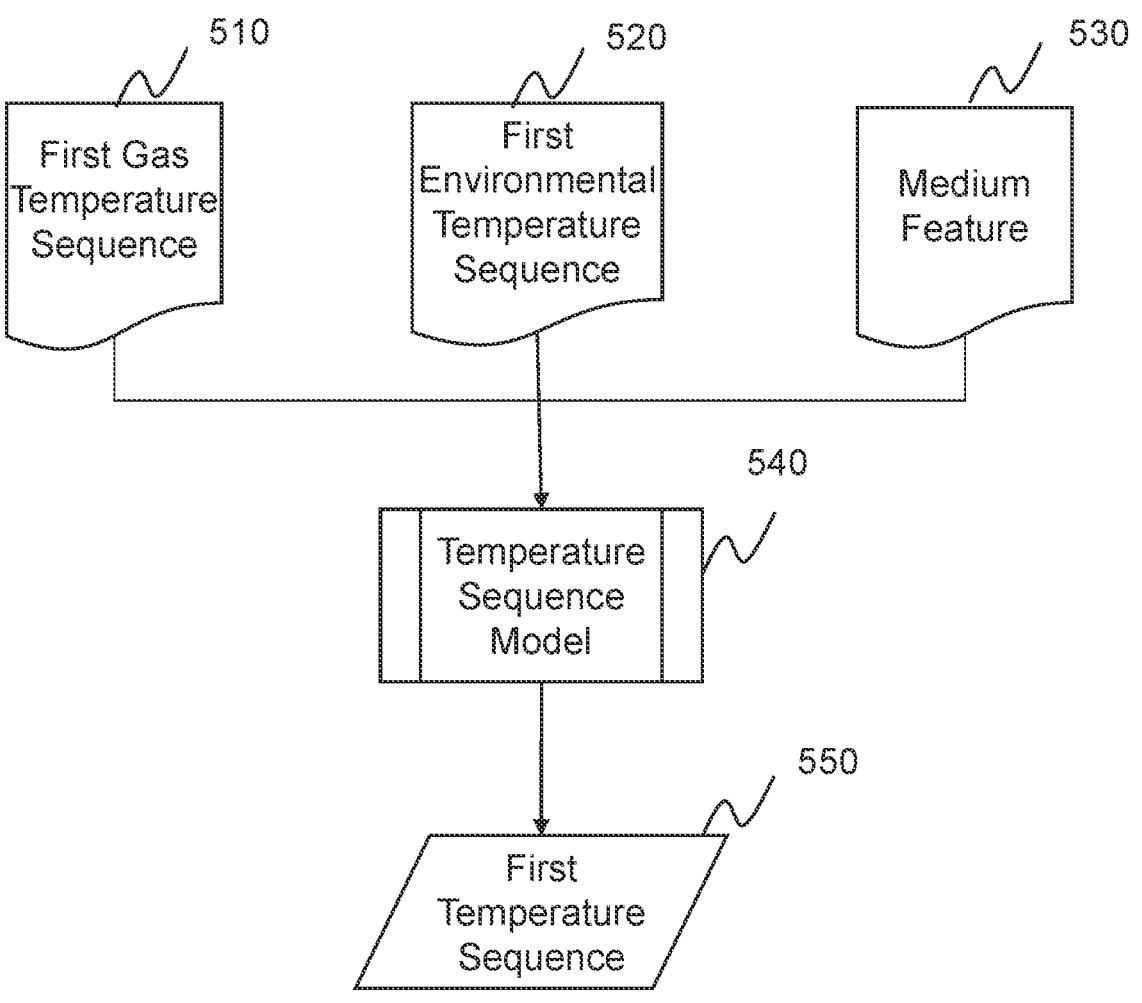
FIG. 5 is an exemplary schematic diagram illustrating determining a first temperature sequence based on a temperature sequence model according to some embodiments of the present disclosure.

FIG. 5 is an exemplary schematic diagram illustrating determining a first temperature sequence based on a temperature sequence model according to some embodiments of the present disclosure. As shown in FIG. 5, an input of the temperature sequence model 540 may include a first gas temperature sequence 510, a first environmental temperature sequence 520, and a medium feature 530 of a target pipeline. An output of the temperature sequence model 540 may be a first temperature sequence 550 of the target pipeline.

In some embodiments, the temperature sequence model 540 may be obtained by training. In some embodiments, a first training sample for training the temperature sequence model 540 may be data for performing a simulation experiment, including a sample first gas temperature sequence, a sample first environmental temperature sequence, and a sample medium feature of the target pipeline. The first training sample may be obtained by presetting or monitoring when the simulation experiment is performed. In some embodiments, a first training label for training the temperature sequence model 540 may be an actual first temperature sequence at a plurality of time points obtained by monitoring in the simulation experiment data.

In some embodiments, the smart gas device management platform 130 may input the first training sample into an initial temperature sequence model to obtain an initial first temperature sequence, construct a loss function based on the initial first temperature sequence and the first training label, and obtain a trained temperature sequence model by updating a parameter of the initial temperature sequence model parameter based on the loss function.

In some embodiments of the present disclosure, the self-learning capability of the machine learning model may be used to learn a relationship between the temperature of the target pipeline and the gas temperature, the environmental temperature, and the medium feature of the target pipeline by processing the first gas temperature sequence, the first environmental temperature sequence, and the medium feature of the target pipeline using the temperature sequence model, so that the accuracy of predicting the temperature of the target pipeline can be improved.

In some embodiments, the first temperature sequence of the target pipeline may include second temperature sequences of a plurality of target pipeline subsections. The second temperature sequence of each target pipeline subsection may be related to a gas transportation direction, a gas transportation distance, and a second environmental temperature sequence of the target pipeline subsection. The second environmental sequence may be determined based on an environmental temperature corresponding to the target pipeline subsection. For example, the environmental temperatures of the target pipeline subsection at a plurality of time points may be combined to form the second environmental temperature sequence.

The gas transportation direction may refer to a direction of gas flow in the target pipeline. The gas transportation distance may refer to a distance that the gas is transmitted from a gas source point to the target pipeline subsection. In some embodiments, the gas transportation distance may be determined based on a distance from the target pipeline subsection to the gas source point. For example, the distance from the target pipeline subsection to the gas source point may be directly determined as the gas transportation distance.

The distance from the gas source point may refer to a distance from a location of the target pipeline subsection relative to a gas transportation starting point. In some embodiments, the smart gas device management platform 130 may determine length information of the target pipeline subsection from the gas source point based on laying planning data of the gas pipeline. For example, the smart gas device management platform 130 may determine the location of the target pipeline subsection and the length information of the gas pipeline based on the laying planning data of the gas pipeline and determine the distance from the target pipeline subsection to the gas source point based on the location and length information.

In some embodiments, the smart gas device management platform 130 may determine a gas temperature of the target pipeline subsection based on the gas transportation direction and the gas transportation distance of the target pipeline subsection. For example, the gas temperature of the target pipeline subsection may be determined based on a gas temperature at the gas source point, the gas transportation direction, the gas transportation distance, and an attenuation coefficient by determining the attenuation coefficient of the gas temperature during transportation (e.g., how many meters is transported, how much the gas temperature decreases) through measurement or experimental simulation. The second gas temperature sequence of the target pipeline subsection may be composed by obtaining the gas temperatures of the target pipeline subsection at a plurality of time points.

The gas temperature in the gas pipeline may attenuate over the transportation distance as the gas is transmitted from the gas source point. A more accurate second gas temperature sequence can be determined by determining the gas transportation direction and the gas transportation distance of the target pipeline subsection.

In some embodiments, the smart gas device management platform 130 may determine the second temperature sequence of the target pipeline subsection by processing the second gas temperature sequence, the second environmental sequence, and a medium feature of the target pipeline subsection based on the temperature sequence model. Specific description of determining the second temperature sequence of the target pipeline subsection based on the temperature sequence model may be found in FIG. 3 and the related description thereof.

In some embodiments, the smart gas device management platform 130 may determine the first temperature sequence of the target pipeline based on the second temperature sequences of the plurality of target pipeline subsections. For example, the second temperature sequences of the plurality of target pipeline subsections may be combined in an order of the location of each target pipeline subsection to form the first temperature sequence of the target pipeline. As another example, an average of the temperature corresponding to each time point in the second temperature sequence of the plurality of target pipeline subsections may be calculated. The average may be combined to form the first temperature sequence of the target pipeline.

In some embodiments, the second temperature sequence of each target pipeline subsection may be also related to a second temperature sequence of a target pipeline subsection adjacent to each target pipeline subsection.

The target pipeline subsection adjacent to each target pipeline subsection (also referred to as adjacent target pipeline subsection of the target pipeline subsection) may refer to an adjacent subsection of the target pipeline subsection that currently needs to determine the second temperature sequence. For example, if the target pipeline is sequentially divided into three sections A, B, and C, the target pipeline subsection adjacent to the target pipeline subsection A may be B, the target pipeline subsections adjacent to the target pipeline subsection B may be A and C, and the target pipeline subsection adjacent to the target pipeline subsection C may be B.

In some embodiments, the smart gas device management platform 130 may determine the second temperature sequence of the target pipeline subsection by inputting the second temperature sequence of the target pipeline subsection adjacent to the target pipeline subsection into the temperature sequence model. That is, the input of the temperature sequence model 540 as shown in FIG. 5 may include the second gas temperature sequence of the target pipeline subsection, the second environmental temperature sequence, the medium feature, and the second temperature sequence of the target pipeline subsection adjacent to each target pipeline subsection. The output of the temperature sequence model 540 may be the second temperature sequence of the target pipeline subsection.

In some embodiments of the present disclosure, the second gas temperature sequence of the target pipeline subsection may be determined based on the gas transportation direction and the gas transportation distance of the target pipeline subsection and the second temperature sequence of the target pipeline subsection may be determined based on the second gas temperature sequence, the second environmental temperature sequence, the medium feature, and the second temperature of the target pipeline subsection adjacent to each target pipeline subsection, which fully considers various kinds of information that may affect the temperature of the target pipeline subsection, improves the accuracy of the determined second temperature sequence of the target pipeline subsection, and provides reliable data support for the subsequent determination of the first temperature sequence of the target pipeline based on the second temperature sequence of the target pipeline subsection.

In some embodiments of the present disclosure, the first temperature sequences of the target pipeline in the plurality of possible scenarios after the target pipeline is put into operation may be determined in advance by determining the first temperature sequences of the target pipeline in the plurality of preset scenarios, which can provide a data basis for determining the corresponding stretching and contracting amount feature and improve the data process efficiency.

It should be noted that the above description of the process 400 is merely provided for the purposes of illustration, and is not intended to limit the scope of the present disclosure. For those skilled in the art, various amendments and variations can be made to the process 400 under the guidance of the present disclosure. However, these amendments and variations remain within the scope of the present disclosure.

FIG. 6 is a flowchart illustrating an exemplary process for determining an installation parameter of a compensator according to some embodiments of the present disclosure. In some embodiments, the process 600 may be performed by the smart gas device management platform 130. As shown in FIG. 6, the process 600 may include the following operations.

In step 610, generating a plurality of sets of first candidate compensation schemes by selecting compensators with different installation parameters.

The first candidate compensation scheme may refer to a scheme that may serve as a final compensator compensation scheme.

In some embodiments, the smart gas device management platform 130 may generate the plurality of sets of first candidate compensation schemes by selecting a plurality of compensators with different installation parameters. The compensator with each set of installation parameters may correspond to a set of first candidate compensation schemes. For example, the smart gas device management platform 130 may generate the plurality of sets of first candidate compensation schemes by randomly combining compensators with different installation quantities, different installation locations, and different device parameters (e.g., a material, a count of corrugations, a wave interval, a wall thickness).

In step 620, predicting an estimated compensation performance of the compensator under different first candidate compensation schemes, wherein the estimated compensation performance is determined based on a compensation feature of the compensator under the estimated stretching and contracting feature.

The estimated compensation performance may refer to an estimated compensation performance and a compensation effect on a target pipeline after the compensator is installed based on the different first candidate compensation schemes. For example, the estimated compensation performance may include an amount of compensation to the target pipeline after the installation of the compensator.

The compensation feature may refer to feature information when the installed compensator compensates for the target pipeline. For example, the compensation feature may include whether compensator elasticity is capable of supporting the stretching and contracting of the target pipeline when a maximum or minimum estimated stretching and contracting amount of the target pipeline is reached after the compensator is installed. As another example, the compensation feature may include whether the compensator has sufficient sensitivity to adapt to a stretching and contracting frequency of the target pipeline when the target pipeline stretches and contracts frequently.

In some embodiments, the smart gas device management platform 130 may determine the compensation feature of the target pipeline of the compensator under the estimated stretching and contracting amount by obtaining historical deformation data and a pressure sensor degree of a laid gas pipeline. In some embodiments, the smart gas device management platform 130 may also simulate a plurality of sets of first candidate compensation schemes corresponding to the target pipeline under the estimated stretching and contracting amount through a simulation experiment to determine the compensation feature of the compensator in each first candidate compensation scheme.

In some embodiments, the smart gas device management platform 130 may determine whether the elasticity of the compensator can support the stretching and contracting of the gas pipeline by obtaining historical pressure data collected by the corresponding pressure sensor when the compensator is stretched to a maximum deformation amount in the laid pipeline.

For example, the smart gas device management platform 130 may obtain a change in the historical pressure data of the pressure sensor when the compensator is stretched to the maximum deformation amount and determine whether the elasticity of the compensator can support the stretching and contracting of the gas pipeline. If the historical pressure data of the pressure sensor is still increasing, it may indicate that the elasticity of the compensator cannot support the stretching and contracting of the gas pipeline. When the compensator is stretched to the maximum deformation amount, it is determined whether a historical reading of the pressure sensor meets a standard reading corresponding to the maximum deformation amount of the compensator. If the historical reading of the pressure sensor is greater than the standard reading, it may mean that the elasticity of the compensator cannot support the stretching and contracting amount of the gas pipeline. The standard reading of the pressure sensor corresponding to the maximum deformation amount of the compensator may be determined by an experiment.

In some embodiments, the smart gas device management platform 130 may determine whether the compensator has sufficient sensitivity to adapt to the stretching and contracting frequency of the gas pipeline by obtaining the historical pressure data collected by the pressure sensor of the compensator in the laid gas pipeline. For example, the smart gas device management platform 130 may collect the historical pressure data of the gas pipeline through the pressure sensor when the stretching and contracting frequency of the gas pipeline is maximum and compare the historical pressure data with a preset pressure value. If the historical pressure data of the gas pipeline is greater than the preset pressure value when the stretching and contracting frequency of the gas pipeline is maximum, it may mean that the compensator does not have sufficient sensitivity to adapt to the stretching and contracting frequency of the gas pipeline.

It should be understood that a plurality of compensators may be included in each first candidate compensation scheme. Therefore, the compensation feature of each compensator in each first candidate compensation scheme may need to be determined.

In some embodiments, the smart gas device management platform 130 may determine the estimated compensation performance of the compensators of each first candidate compensation scheme based on the compensation features of the compensators of each first candidate compensation scheme corresponding to the target pipeline. For example, the smart gas device management platform 130 may score the compensation feature of each compensator of each first candidate compensation scheme and average a plurality of scores as the estimated compensation performance of the compensators of the first candidate compensation scheme. The score may be determined based on the elasticity and sensitivity of the compensator in the compensator compensation feature. A scoring criteria may be preset.

In step 630, determining a first compensation scheme based on the estimated compensation performance and determining the installation parameter of the compensator based on the first compensation scheme.

The first compensation scheme may refer to an optimal compensator compensation scheme suitable for the target pipeline.

In some embodiments, the smart gas device management platform 130 may determine the optimal first compensation scheme based on the score corresponding to the compensation performance. For example, the first candidate compensation scheme with a highest score corresponding to the compensation performance may be determined as the first compensation scheme.

In some embodiments, the smart gas device management platform 130 may determine the installation parameter based on the compensation parameter of the compensator in the optimal first compensation scheme. For example, the smart gas device management platform 130 may determine the location, the quantity, and the device parameter of a compensator to be installed based on the device parameter, the installation location, and the installation quantity of the compensation parameter.

In some embodiments, the installation parameter may also include a pre-stretching degree of the compensator and the pre-stretching degree may be determined based on a stretching performance of the compensator and stretching and contracting balance of the target pipeline.

The pre-stretching degree may refer to an appropriate length of the compensator that is pre-stretched.

The stretching performance may refer to a maximum extent or a maximum length that the compensator can be stretched. In some embodiments, the stretching performance of the compensator may be obtained through an experiment. For example, the maximum length that the compensator can be stretched may be determined as the stretching performance by performing a stretching experiment on the compensator.

The stretching and contracting balance may refer to a stretching and contracting amount of the target pipeline as the target pipeline remains in balance during a stretching and contracting process, including a contracting amount during contracting balance and a stretching amount during stretching balance. In some embodiments, the smart gas device management platform 130 may determine the stretching and contracting balance based on a stretching and contracting amount feature of the target pipeline. For example, the stretching and contracting amount during the stretching and contracting balance may be extracted from the stretching and contracting amount feature.

In some embodiments, the smart gas device management platform 130 may determine the pre-stretching degree based on the stretching performance of the compensator and the stretching and contracting balance of the target pipeline. For example, a length of the compensator to be stretched (the compensator may relatively need to be stretched if the gas pipeline contracts) may be determined based on the contracting amount of the target pipeline during the contracting balance and a length of the compensator to be contracted may be determined based on the stretching amount of the target pipeline during the stretching balance. Further, the smart gas device management platform 130 may determine the pre-stretching degree based on the stretching performance of the compensator in combination with the length to be stretched and the length to be contracted.

Exemplarily, the smart gas device management platform 130 may first compare the length of the compensator to be stretched with the length of the compensator to be contracted. If the length of the compensator to be stretched is greater than the length of the compensator to be contracted, the pre-stretching degree may be determined based on the length of the compensator to be stretched. Conversely, pre-stretching degree may be based on the length of the compensator to be contracted. Further, the smart gas device management platform 130 may compare the length of the compensator to be stretched with the stretching performance of the compensator (the maximum length that the compensator can be stretched). If the length of the compensator to be stretched is greater than the stretching performance of the compensator, the stretching performance of the compensator may be determined as the pre-stretching degree. Conversely, the length of the compensator to be stretched may be determined as the pre-stretching degree.

Before being installed, the compensator may need to be pre-stretched so that the compensator may be installed at both ends of the gas pipeline while remaining stretched, which can play a compensating role for the gas pipeline when the gas pipeline expands (squeezes the compensator at both ends). Obviously, the pre-stretching degree may not be stretched to a limit state of the compensator, so that when the compensator in the state is installed in the gas pipeline, the compensator in the limit state may not compensate for the gas pipeline when the gas pipeline contracts and damage may be caused to the compensator. Therefore, the determination of the appropriate pre-stretching degree can improve the compensation performance of the compensator and can also extend the service life of the compensator.

In some embodiments of the present disclosure, the optimal first compensation scheme may be determined by selecting a plurality of sets of first candidate compensation schemes and based on the compensation performance of the compensator in each first candidate compensation scheme and the installation parameter may be determined based on the optimal first compensation scheme. The reasonableness and effectiveness of the determined compensation scheme can be improved by selecting the optimal compensation scheme in the plurality of possible compensation schemes that are designed.

It should be noted that the above description of the process 600 is merely provided for the purposes of illustration, and is not intended to limit the scope of the present disclosure. For those skilled in the art, various amendments and variations can be made to the process 600 under the guidance of the present disclosure. However, these amendments and variations remain within the scope of the present disclosure.

FIG. 7 is a flowchart illustrating an exemplary process for determining an installation distance of a compensator according to some embodiments of the present disclosure. In some embodiments, the process 700 may be performed by the smart gas device management platform 130.

In some embodiments, an installation parameter may also include the installation distance. As shown in FIG. 7, the installation distance may be determined by the following operations.

In step 710, generating a plurality of sets of second candidate compensation schemes by selecting compensators with different installation parameters and presetting different installation distances.

The installation distance may refer to an installation interval distance between compensators. For example, the installation distance may be 100 meters, 50 meters, 10 meters, etc.

The second candidate compensation scheme may refer to a scheme that includes the installation distance and may be a final compensation scheme.

In some embodiments, the smart gas device management platform 130 may generate the plurality of sets of second candidate compensation schemes by selecting a plurality of compensators with different installation parameters and presetting a plurality of different installation distances for the compensators with different installation parameters. The compensator with each set of installation parameters and an installation distance may correspond to a set of second candidate compensation schemes. For example, the smart gas device management platform 130 may generate the plurality of sets of second candidate compensation schemes by randomly combining a plurality of compensators with different installation quantities, different installation locations, different device parameters (e.g., a material, a count of corrugations, a wave interval, a wall thickness), and different installation distances.

In some embodiments, the smart gas device management platform 130 may preset, based on a first candidate compensation scheme, the different installation distance for the compensator to generate the second candidate compensation scheme.

In step 720, for each set of second candidate compensation schemes, calculating the estimated compensation performance of each compensator at an interval of the installation distance corresponding to the second candidate compensation scheme, wherein the estimated compensation performance is determined based on a second estimated stretching and contracting amount sequence of the target pipeline subsection connected to both ends of the compensator.

The smart gas equipment management platform 130 may, for each set of second candidate compensation schemes, determine a compensation feature of each compensator at an interval of the corresponding installation distance based on the second estimated stretching and contracting amount sequence of the target pipeline subsection at both ends of each interval. The compensation feature of the compensator may be determined based on the second estimated stretching and contracting amount sequence of the target pipeline subsection in a same way that the compensation feature of the compensator is determined based on the estimated stretching and contracting amount of the target pipeline. Further description may be found in the operation 620 of FIG. 6 and the related description thereof, which will not be repeated herein.

In some embodiments, the smart gas device management platform 130 may determine the compensation performance of the compensator based on the compensation feature of the compensator. The specific determination may be found in the operation 620 of FIG. 6 and the related description thereof, which will not be repeated herein.

In some embodiments, the second estimated stretching and contracting amount sequence may be determined based on a stretching and contracting amount sequence model. In some embodiments, the smart gas device management platform 130 may input a pipeline feature, an estimated operation feature, and a second temperature sequence of the target pipeline subsection into the stretching and contracting amount sequence model and output the second estimated stretching and contracting amount sequence. The stretching and contracting amount sequence model may be a machine learning model.

In some embodiments, the second temperature sequence of the target pipeline subsection may be determined by a second gas temperature sequence, a second environmental temperature sequence, and a medium feature of the target pipeline subsection. In some embodiments, the second gas temperature sequence of the target pipeline subsection may be related to a gas transportation direction and a gas transportation distance of the target pipeline subsection. Therefore, an input of the stretching and contracting amount sequence model may also include the gas transportation direction and the gas transportation distance of the target pipeline subsection, the second environmental temperature sequence corresponding to the target pipeline subsection, the medium feature of the target pipeline subsection, and the second temperature sequence of the target pipelines subsection adjacent to each target pipeline subsection. Further description regarding the gas transportation direction and the gas transportation distance of the target pipeline subsection may be found in FIG. 5 and the related description thereof.

In some embodiments, the stretching and contracting amount sequence model may include a Deep Neural Networks (DNN) model, a Recurrent Neural Networks (RNN) model, other custom networks model, or any combination thereof.

Figure 8:
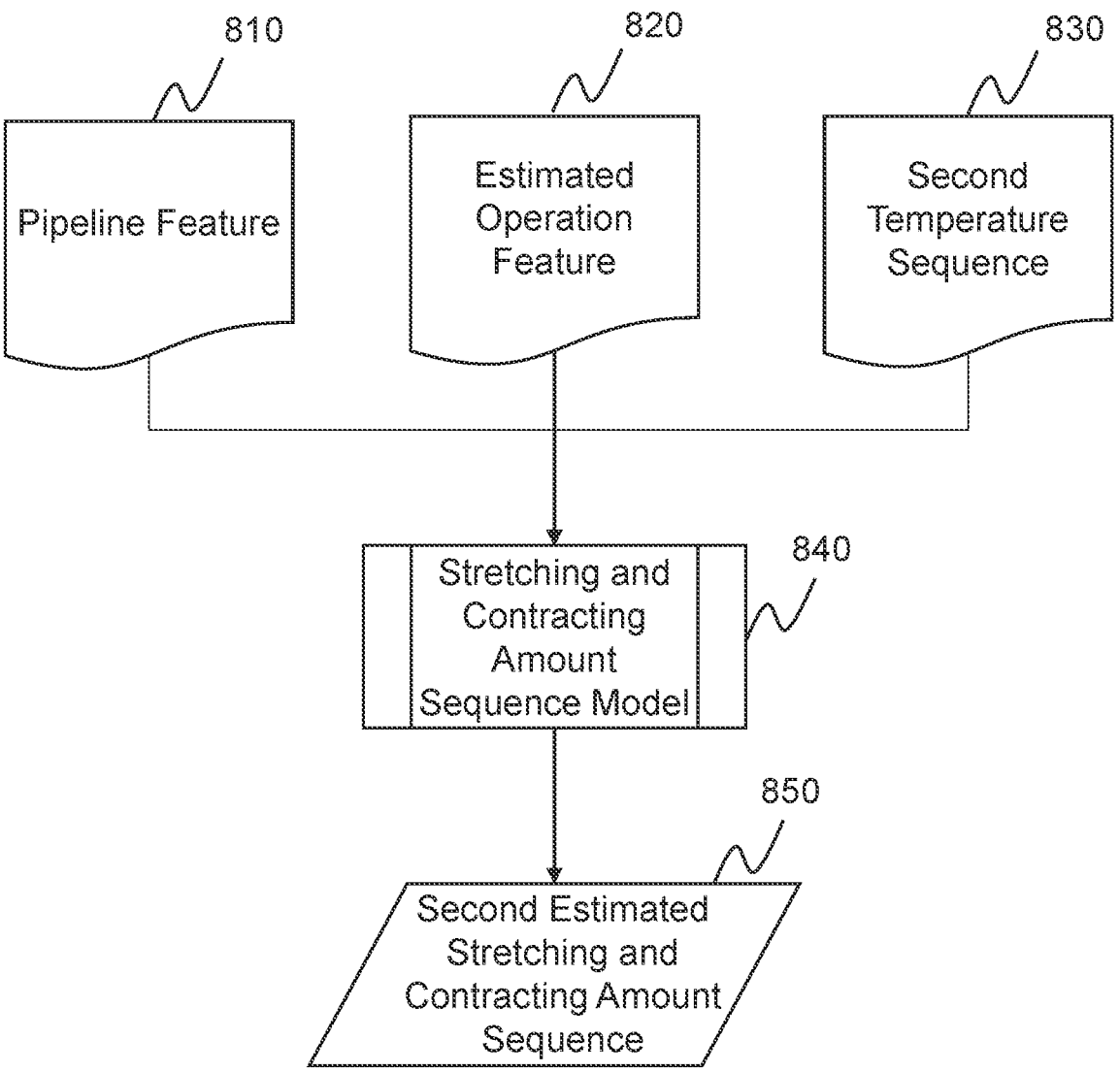
FIG. 8 is an exemplary schematic diagram illustrating determining a second estimated stretching and contracting amount sequence based on a stretching and contracting amount sequence model according to some embodiments of the present disclosure.

FIG. 8 is an exemplary schematic diagram illustrating determining of a second estimated stretching and contracting amount sequence based on a stretching and contracting amount sequence model according to some embodiments of the present disclosure.

As shown in FIG. 8, an input of a stretching and contracting amount sequence model 840 may include a pipeline feature 810, an estimated operation feature 820, and a second temperature sequence 830 of a target pipeline subsection. An output of the stretching and contracting amount sequence model 840 may be the second estimated stretching and contracting amount sequence 850 of the target pipeline subsection. Further description regarding the pipeline feature and the estimated operation feature may be found in FIG. 2 and the related description thereof. Further description regarding the second temperature sequence of the target pipeline subsection corresponding to each preset scenario may be found in FIG. 4 and the related description thereof. Further description regarding the second estimated stretching and contracting amount sequence may be found in FIG. 2 and the related description thereof.

In some embodiments, the stretching and contracting amount sequence model 840 may be obtained by training.

In some embodiments, a second training sample for training the stretching and contracting amount sequence model 840 may be simulation experiment data, including a sample pipeline feature, a sample operation feature, and a sample second temperature sequence of the target pipeline subsection corresponding to each preset scenario. The second training sample may be obtained by performing a simulation experiment. For example, a preset pipeline feature may be served as the sample pipeline feature when the simulation experiment is performed. The operation feature and the second temperature sequence may be obtained as the sample operation feature and the sample second temperature sequence when the target pipeline subsection is simulated to operate in the plurality of preset scenarios.

In some embodiments, a second training label for training the stretching and contracting amount sequence model 840 may be the second estimated stretching and contracting amount sequence corresponding to each set of second training sample when the simulation experiment is performed. The second training label may be obtained by actual measurement when the simulation experiment is performed.

In some embodiments, the smart gas device management platform 130 may input the second training sample into an initial stretching and contracting amount sequence model to obtain an initial second estimated stretching and contracting amount sequence, construct a loss function based on the initial second estimated stretching and contracting amount sequence and the second training label, and obtain a trained stretching and contracting amount sequence model by updating a parameter of the initial stretching and contracting amount sequence model based on the loss function.

In some embodiments of the present disclosure, the self-learning capability of the machine learning model may be used to obtain a relationship between the pipeline feature, the estimated operation feature, and the temperature of target pipeline subsection corresponding to each preset scenario and the stretching and contracting amount of the target pipeline subsection by processing the pipeline feature, the estimated operation feature, and the second temperature sequence of the target pipeline subsection corresponding to each preset scenario using the stretching and contracting amount sequence model, so that the data processing efficiency and the accuracy of determining the second estimated stretching and contracting amount sequence can be improved.

In step 730, determining a second compensation scheme based on the estimated compensation performance and determining the installation distance of the compensator based on the second compensation scheme.

In some embodiments, the smart gas device management platform 130 may determine a second candidate compensation scheme based on the estimated compensation performance. The specific manner for determining the second candidate compensation scheme may be the same as a manner for determining an optimal first compensation scheme, which may be found in FIG. 6, the operation 630, and the related description thereof and will not be repeated herein.

In some embodiments of the present disclosure, the second compensation scheme may be determined based on the compensation performance by determining a plurality of candidate compensation schemes and determining the compensation performance of the compensator of each set of second candidate compensation schemes and then the corresponding installation distance may be determined based on the second compensation scheme. In this way, a more suitable installation distance for the compensator can be further determined based on the first compensation scheme, and the reasonableness of the installation parameter of the compensator can be improved.

It should be noted that the above description of the process 700 is merely provided for the purposes of illustration, and is not intended to limit the scope of the present disclosure. For those skilled in the art, various amendments and variations can be made to the process 700 under the guidance of the present disclosure. However, these amendments and variations remain within the scope of the present disclosure.

According to one of the embodiments of the present disclosure, a non-transitory computer-readable storage medium storing computer instructions is further provided. When reading the computer instructions in the storage medium, the computer may execute the method for installing a gas pipeline compensator of smart gas described in the embodiments of the present disclosure.

The beneficial effects brought about by the embodiments of the present disclosure may include, but are not limited to: (1) By estimating the possible stretching and contracting feature of the target pipeline in advance and determining the appropriate compensator installation scheme based on the stretching and contracting feature, inadequate compensation or excessive compensation of the gas pipeline (resulting in waste of resources) caused by blind installation of compensators can be avoided, and at the same time the influence of the feature of the target pipeline and future operating environmental feature on the stretching and contracting amount of the gas pipeline can be considered, thereby determining the installation parameter of the compensator more accurately and reasonably, improving the effectiveness of installation of the gas pipeline compensator, and increasing the service life of the gas pipeline; (2) the final stretching and contracting amount feature of the target pipeline may be determined by dividing the target pipeline into the plurality of target pipeline subsections and respectively determining the second estimated stretching and contracting amount sequence of each target pipeline subsection, which considers the differences in environmental temperature and gas temperature of different target pipeline subsections and makes the determined stretching and contracting amount feature of the target pipeline more accurate; and (3) the optimal compensation scheme may be determined by selecting the candidate compensation schemes and based on the compensation performance of the compensator in each candidate compensation scheme and then the installation parameter may be determined according to the optimal first compensation scheme. The reasonableness and effectiveness of the determined compensation scheme can be improved by selecting the optimal compensation scheme in the plurality of possible compensation schemes that are designed.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or feature described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some feature, structures, or feature in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various feature is sometimes grouped together in a single embodiment, figure, or description thereof for the purpose of streamlining the disclosure aiding in the understanding of one or more of the various embodiments. However, this disclosure does not mean that the present disclosure object requires more feature than the feature mentioned in the claims. Rather, claimed subject matter may lie in less than all feature of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for installing a gas pipeline compensator of smart gas, implemented by a processor of a smart gas device management platform of an Internet of Things system for installing a gas pipeline compensator of smart gas, wherein the Internet of Things system includes a smart gas user platform, a smart gas service platform, the smart gas device management platform, a smart gas sensor network platform, and a smart gas object platform, the smart gas device management platform includes a smart gas indoor device management sub-platform, a smart gas pipeline network device management sub-platform, and a smart gas data center: the smart gas object platform is configured as a terminal device; the smart gas sensor network platform is configured to upload data collected by a sensor device to the smart gas device management platform;

the smart gas device management platform includes the processor and a storage medium;

the method comprising:

obtaining a pipeline feature and an estimated operation feature of a target pipeline from the terminal device of the smart gas object platform, and uploading the pipeline feature and the estimated operation feature to the smart gas data center of the smart gas device management platform;

generating an estimated stretching and contracting feature of the target pipeline based on the pipeline feature and the estimated operation feature;

wherein the estimated stretching and contracting feature includes a first estimated stretching and contracting amount sequence, and the generating the estimated stretching and contracting feature of the target pipeline based on the pipeline feature and the estimated operation feature includes:

obtaining a first gas temperature sequence and a first environmental temperature sequence of a preset scenario;

determining a first temperature sequence of the target pipeline based on the first gas temperature sequence, the first environmental temperature sequence, and a medium feature of the target pipeline, wherein the medium feature includes an internal medium feature and an external medium feature of the target pipeline;

determining the first estimated stretching and contracting amount sequence of the target pipeline through a temperature sequence model based on the pipeline feature, the estimated operation feature, and the first temperature sequence, wherein the first temperature sequence and the first estimated stretching and contracting amount sequence correspond to the preset scenario;

the temperature sequence model is a deep neural network;

first training samples of the temperature sequence model are data used for performing simulation experiments, including a sample first gas temperature sequence, a sample first environmental temperature sequence, and a sample medium feature of the target pipeline;

first training labels of the temperature sequence model are actual first temperature sequences at multiple time points obtained through monitoring in the simulation experiment data;

the smart gas device management platform inputs the first training samples into an initial temperature sequence model to obtain an initial first temperature sequence, constructs a loss function based on the initial first temperature sequence and the first training labels, and obtains a trained temperature sequence model by updating parameters of the initial temperature sequence model based on the loss function:

generating an installation parameter of a compensator based on the estimated stretching and contracting feature, wherein the installation parameter at least includes a device parameter of the compensator and a pre-stretching degree of the compensator;

transmitting the installation parameter to the smart gas user platform; and pre-stretching the compensator based on the pre-stretching degree of the compensator, to install the compensator at both ends of the target pipeline while maintaining stretched state.

2. The method of claim 1, wherein the determining the first temperature sequence of the target pipeline based on the first gas temperature sequence, the first environmental temperature sequence, and a medium feature of the target pipeline comprises:

inputting the first gas temperature sequence, the first environmental temperature sequence, and the medium feature of the target pipeline into the temperature sequence model and outputting the first temperature sequence of the target pipeline.

3. The method of claim 1, wherein the first temperature sequence of the target pipeline includes second temperature sequences of a plurality of target pipeline subsections, and the second temperature sequence of each target pipeline subsection is related to a gas transportation direction, a gas transportation distance, and a second environmental temperature sequence of the target pipeline subsection, wherein the gas transportation distance is determined based on a distance from the target pipeline subsection and a gas source point; and the second environmental temperature sequence is determined based on an environmental temperature corresponding to the target pipeline subsection.

4. The method of claim 3, wherein the second temperature sequence of each target pipeline subsection is also related to a second temperature sequence of a target pipeline subsection adjacent to each target pipeline subsection.

5. The method of claim 1, wherein the target pipeline is divided into a plurality of target pipeline subsections based on a preset rule, and the first estimated stretching and contracting amount sequence of the target pipeline includes second estimated stretching and contracting amount sequences of the plurality of target pipeline subsections; and the determining the first estimated stretching and contracting amount sequence of the target pipeline through the temperature sequence model based on the pipeline feature, the estimated operation feature, and the first temperature sequence comprises:

determining the second estimated stretching and contracting amount sequence of the target pipeline subsection based on the pipeline feature, the estimated operation feature, and second temperature sequences of the target pipeline subsections, wherein the second temperature sequence and the second estimated stretching and contracting amount sequence correspond to the preset scenario.

6. The method of claim 5, wherein the second temperature sequences of the target pipeline subsections are determined by inputting a second gas temperature sequence, a second environmental temperature sequence, and a medium feature of the target pipeline subsection into the temperature sequence model.

7. The method of claim 1, wherein the generating an installation parameter of a compensator based on the estimated stretching and contracting feature comprises:

generating a plurality of sets of first candidate compensation schemes by selecting compensators with different installation parameters;

predicting an estimated compensation performance of the compensator under different first candidate compensation schemes, wherein the estimated compensation performance is determined based on a compensation feature of the compensator under the estimated stretching and contracting feature; and determining a first compensation scheme based on the estimated compensation performance and determining the installation parameter of the compensator based on the first compensation scheme.

8. The method of claim 7, wherein the pre-stretching degree is determined based on a stretching performance of the compensator and stretching and contracting balance of the target pipeline.

9. The method of claim 7, wherein the installation parameter also includes an installation distance, and the installation distance is determined by:

generating a plurality of sets of second candidate compensation schemes by selecting compensators with different installation parameters and presetting different installation distances;

for each set of second candidate compensation schemes, calculating the estimated compensation performance of each compensator at an interval of the installation distance corresponding to the second candidate compensation scheme, wherein the estimated compensation performance is determined based on a second estimated stretching and contracting amount sequence of the target pipeline subsection connected to both ends of the compensator; and determining a second compensation scheme based on the estimated compensation performance and determining the installation distance of the compensator based on the second compensation scheme.

10. The method of claim 9, wherein the second estimated stretching and contracting amount sequence is determined by inputting the pipeline feature, the estimated operation feature, and a second temperature sequence of the target pipeline subsection into a stretching and contracting amount sequence model, wherein the stretching and contracting amount sequence model is a machine learning model.

11. The method of claim 1, wherein the smart gas user platform includes a plurality of smart gas user sub-platforms;

the smart gas service platform includes a plurality of smart gas service sub-platforms, and different smart gas service sub-platforms correspond to different smart gas user sub-platforms;

the smart gas sensor network platform includes a smart gas indoor sensor network sub-platform and a smart gas pipeline network sensor network sub-platform, the smart gas indoor sensor network sub-platform corresponds to the smart gas indoor management sub-platform, and the smart gas pipeline network sensor network sub-platform corresponds to the smart gas pipeline network management sub-platform;

the smart gas object platform includes a smart gas indoor object sub-platform and a smart gas pipeline network object sub-platform, the smart gas indoor object sub-platform corresponds to the smart gas indoor sensor network sub-platform, and the smart gas pipeline network object sub-platform corresponds to the smart gas pipeline network sensor network sub-platform;

the pipeline feature and the estimated operation feature of the target pipeline are obtained based on the smart gas object platform and uploaded to the smart gas data center of the smart gas management platform based on the smart gas sensor network sub-platform corresponding to the smart gas object platform; and the method for installing a gas pipeline compensator of smart gas comprises:

different smart gas management sub-platforms obtaining data uploaded by the smart gas sensor network sub-platforms corresponding to the different smart gas management sub-platforms from the smart gas data center and determining the installation parameter of the compensator; and transferring the installation parameter of the compensator to the smart gas service platform through the smart gas data center, and the smart gas service platform uploading the installation parameter to the smart gas user platform.

12. An Internet of Things system for installing a gas pipeline compensator of smart gas, comprising a smart gas user platform, a smart gas service platform, a smart gas management platform, a smart gas sensor network platform, and a smart gas object platform, wherein the smart gas user platform includes a plurality of smart gas user sub-platforms;

the smart gas service platform includes a plurality of smart gas service sub-platforms and different smart gas service sub-platforms correspond to different smart gas user sub-platforms;

the smart gas device management platform includes a smart gas indoor device management sub-platform, a smart gas pipeline network device management sub-platform, and a smart gas data center;

the smart gas sensor network platform includes a smart gas indoor sensor network sub-platform and a smart gas pipeline network sensor network sub-platform and sensor network platform is configured to upload data collected by a sensor device to the smart gas device management platform;

the smart gas object platform includes a smart gas indoor object sub-platform and a smart gas pipeline network object sub-platform, the smart gas indoor object sub-platform corresponds to the smart gas indoor sensor network sub-platform, the smart gas pipeline network object sub-platform corresponds to the smart gas pipeline network sensor network sub-platform, and the smart gas object platform is configured as terminal a device and the smart gas object platform is configured to obtain a pipeline feature and an estimated operation feature of a target pipeline from the terminal device of the smart gas object platform, and upload the pipeline feature and the estimated operation feature to the smart gas data center of the smart gas management platform based on the smart gas sensor network sub-platform corresponding to the smart gas object platform;

the smart gas management platform is configured to:

generate an estimated stretching and contracting feature of the target pipeline based on the pipeline feature and the estimated operation feature, wherein the estimated stretching and contracting feature includes a first estimated stretching and contracting amount sequence;

to generate the estimated stretching and contracting feature of the target pipeline based on the pipeline feature and the estimated operation feature, the smart gas management platform is further configured to:

obtain a first gas temperature sequence and a first environmental temperature sequence of a preset scenario;

determine a first temperature sequence of the target pipeline based on the first gas temperature sequence, the first environmental temperature sequence, and a medium feature of the target pipeline, wherein the medium feature includes an internal medium feature and an external medium feature of the target pipeline; and determine the first estimated stretching and contracting amount sequence of the target pipeline through a temperature sequence model based on the pipeline feature, the estimated operation feature, and the first temperature sequence;

wherein the first temperature sequence and the first estimated stretching and contracting amount sequence correspond to the preset scenario;

the temperature sequence model is a deep neural network;

first training samples of the temperature sequence model are data used for performing simulation experiments, including a sample first gas temperature sequence, a sample first environmental temperature sequence, and a sample medium feature of the target pipeline;

first training labels of the temperature sequence model are actual first temperature sequences at multiple time points obtained through monitoring in the simulation experiment data;

the smart gas device management platform inputs the first training samples into an initial temperature sequence model to obtain an initial first temperature sequence, constructs a loss function based on the initial first temperature sequence and the first training labels, and obtains a trained temperature sequence model by updating parameters of the initial temperature sequence model based on the loss function:

generate an installation parameter of the compensator based on the estimated stretching and contracting feature, wherein the installation parameter at least includes a device parameter of the compensator; and transmit the installation parameter of the compensator to the smart gas service platform based on the smart gas data center and a pre-stretching degree of the compensator; transmit the installation parameter to the smart gas user platform;

pre-stretch the compensator based on the pre-stretching degree of the compensator, to install the compensator at both ends of the target pipeline while maintaining stretched state; and the smart gas service platform is configured to upload the installation parameter of the compensator to the smart gas user platform.

13. The Internet of Things system of claim 12, wherein target pipeline is divided into a plurality of target pipeline subsections based on a preset rule, and the first estimated stretching and contracting amount sequence of the target pipeline includes second estimated stretching and contracting amount sequences of the plurality of target pipeline subsections; and the smart gas management platform is further configured to:

determine the second estimated stretching and contracting amount sequence of a target pipeline subsection based on the pipeline feature, the estimated operation feature, and second temperature sequences of the target pipeline subsections, wherein the second temperature sequence and the second estimated stretching and contracting amount sequence correspond to the preset scenario.

14. The Internet of Things system of claim 12, wherein the smart gas management platform is further configured to:

generate a plurality of sets of first candidate compensation schemes by selecting compensators with different installation parameters;

predict an estimated compensation performance of the compensator under different first candidate compensation schemes, wherein the estimated compensation performance is determined based on a compensation feature of the compensator under the estimated stretching and contracting feature; and determine a first compensation scheme based on the estimated compensation performance and determine the installation parameter of the compensator based on the first compensation scheme.

15. A non-transitory computer-readable storage medium storing computer instructions, wherein when reading the computer instructions in the storage medium, the computer executes the method for installing a gas pipeline compensator of smart gas of claim 1.

16. The method of claim 1, wherein the smart gas indoor device management sub-platform and the smart gas pipeline network device management sub-platform include a device operation monitoring and warning module and a device remote management module;

the device operation monitoring and warning module is configured to view historical and real-time data of indoor and/or pipeline network device operation parameter and monitor and warn according to a preset threshold; and the device remote management module is configured to remotely set and adjust a parameter of at least one of a smart gas indoor object platform device or a smart gas object platform device in a pipeline network of smart gas, and remotely authorize device parameter adjustment initiated on site by at least one of the smart gas indoor object platform device or the smart gas object platform device in the pipeline network of smart gas.

* * * * *